US007111040B2

(12) United States Patent
Yoshii et al.

(10) Patent No.: US 7,111,040 B2
(45) **Date of Patent: *Sep. 19, 2006**

(54) DIGITAL BROADCAST RECEIVER FOR A DIGITAL BROADCASTING SYSTEM

(75) Inventors: Taketo Yoshii, Hyogo (JP); Takuya Sekiguchi, Osaka (JP); Satoshi Tsujimura, Hyogo (JP); Keisei Yamamuro, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/756,405

(22) Filed: Jan. 14, 2004

(65) Prior Publication Data

US 2004/0205128 A1 Oct. 14, 2004

Related U.S. Application Data

(62) Division of application No. 09/548,744, filed on Apr. 13, 2000, now Pat. No. 6,711,620.

(30) Foreign Application Priority Data

Apr. 14, 1999 (JP) ................................ 11-106739

(51) Int. Cl.
*G06F 15/16* (2006.01)

(52) U.S. Cl. ...................... 709/203; 709/217; 709/225; 709/229; 719/318; 719/320

(58) Field of Classification Search ........ 709/202–203, 709/206–207, 217–219, 225–229; 719/313, 719/318, 319, 320, 328, 329; 718/100, 104, 718/108
See application file for complete search history.

(56) References Cited

U.S. PATENT DOCUMENTS

| | | | | |
|---|---|---|---|---|
| 5,212,792 | A | 5/1993 | Gerety et al. | |
| 5,537,143 | A * | 7/1996 | Steingold et al. | 725/119 |
| 5,544,300 | A * | 8/1996 | Skarbo et al. | 715/759 |
| 5,619,501 | A | 4/1997 | Tamer et al. | |
| 5,627,960 | A * | 5/1997 | Clifford et al. | 715/842 |

(Continued)

FOREIGN PATENT DOCUMENTS

EP 000780757 A2 * 11/1996

(Continued)

OTHER PUBLICATIONS

English language Abstract of JP 5-11962.

(Continued)

*Primary Examiner*—Bharat Barot
(74) *Attorney, Agent, or Firm*—Greenblum & Bernstein, P.L.C.

(57) ABSTRACT

To provide a device capable of determining a delivery destination of an event automatically without requiring choosing operation of an operator. An event entered through an event input means 4 is given to a delivery destination determining means 6 which in turn determines to which of applications AP1, AP2, . . . , APn the given event is to be delivered according to the contents of the event and according to delivery destination determining information stored in a delivery destination determining information storing section, and delivers accordingly. Therefore, the event is delivered to an appropriate application even if the operator does not choose an addressed application.

13 Claims, 51 Drawing Sheets

OVERALL CONFIGURATION OF RECEIVER (8TH EMBODIMENT)

HARDWARE CONFIGURATION OF DIGITAL BROADCAST RECEIVER

U.S. PATENT DOCUMENTS

| | | | | | |
|---|---|---|---|---|---|
| 5,692,142 | A | * | 11/1997 | Craycroft et al. | 715/744 |
| 5,717,880 | A | * | 2/1998 | Imai et al. | 715/781 |
| 5,734,901 | A | * | 3/1998 | Sidhu et al. | 712/220 |
| 5,742,778 | A | * | 4/1998 | Hao et al. | 715/759 |
| 5,767,849 | A | * | 6/1998 | Borgendale et al. | 715/745 |
| 5,801,696 | A | * | 9/1998 | Roberts | 715/781 |
| 5,805,162 | A | * | 9/1998 | Imai et al. | 715/788 |
| 5,818,935 | A | | 10/1998 | Maa | |
| 5,825,865 | A | | 10/1998 | Oberlander et al. | |
| 6,040,833 | A | * | 3/2000 | Henshaw | 715/794 |
| 6,343,379 | B1 | * | 1/2002 | Ozawa et al. | 725/63 |
| 6,397,264 | B1 | * | 5/2002 | Stasnick et al. | 719/328 |
| 6,492,997 | B1 | * | 12/2002 | Gerba et al. | 715/721 |
| 6,609,251 | B1 | * | 8/2003 | Yoneda | 725/71 |
| 6,618,733 | B1 | * | 9/2003 | White et al. | 707/103 Y |
| 6,647,432 | B1 | * | 11/2003 | Ahmed et al. | 719/318 |
| 2004/0107248 | A1 | | 6/2004 | Yoshii et al. | |
| 2004/0107446 | A1 | | 6/2004 | Yoshii et al. | |
| 2004/0148345 | A1 | | 7/2004 | Yoshii et al. | |
| 2004/0148413 | A1 | | 7/2004 | Yoshii et al. | |
| 2004/0148414 | A1 | | 7/2004 | Yoshii et al. | |

FOREIGN PATENT DOCUMENTS

| | | |
|---|---|---|
| JP | 5-11962 | 1/1993 |
| JP | 5-250126 | 9/1993 |

OTHER PUBLICATIONS

English language Abstract of JP 5-250126.

* cited by examiner

HARDWARE CONFIGURATION OF DIGITAL BROADCAST RECEIVER

FIG.4

DELIVERY PRIORITY INFORMATION

| | INTERNET BROWSER | E-MAIL | TUNING |
|---|---|---|---|
| 1 | — | — | 1 |
| 2 | — | — | 1 |
| 3 | — | — | 1 |
| ⋮ | ⋮ | ⋮ | ⋮ |
| 9 | — | — | 1 |
| 0 | — | — | 1 |
| # | 2 | 1 | 3 |
| ⋮ | ⋮ | ⋮ | ⋮ |
| △ | 2 | 1 | — |
| ▷ | 2 | 1 | — |
| ▽ | 2 | 1 | — |
| ◁ | 2 | 1 | — |
| DECISION | 2 | 1 | — |
| RETURN | 2 | 1 | — |
| MENU | — | — | — |
| ⋮ | ⋮ | ⋮ | ⋮ |
| POWER | — | — | — |
| ⋮ | ⋮ | ⋮ | ⋮ |

EXTERNAL VIEW OF REMOTE CONTROLLER

OVERALL CONFIGURATION OF EVENT CONTROL DEVICE (2ND EMBODIMENT)

FIG.10

EVENT SPECIFYING INFORMATION

| | |
|---|---|
| COMBINATION OF APPLICATION | INTERNET BROWSER |
| | E-MAIL |
| | TUNING |

| | INTERNET BROWSER | E-MAIL | TUNING |
|---|---|---|---|
| 1 | — | — | ○ |
| 2 | — | — | ○ |
| 3 | — | — | ○ |
| ⋮ | ⋮ | ⋮ | ⋮ |
| 9 | — | — | ○ |
| 0 | — | — | ○ |
| # | — | ○ | — |
| ⋮ | ⋮ | ⋮ | ⋮ |
| △ | — | ○ | — |
| ▷ | — | ○ | — |
| ▽ | — | ○ | — |
| ◁ | — | ○ | — |
| DECISION | — | ○ | — |
| RETURN | — | ○ | — |
| MENU | — | — | — |
| ⋮ | ⋮ | ⋮ | ⋮ |
| POWER | — | — | — |
| ⋮ | ⋮ | ⋮ | ⋮ |

FIG.11

EVENT SPECIFYING INFORMATION

| | |
|---|---|
| COMBINATION OF APPLICATION | INTERNET BROWSER |
| | TUNING |

| | INTERNET BROWSER | TUNING |
|---|---|---|
| 1 | — | ○ |
| 2 | — | ○ |
| 3 | — | ○ |
| ⋮ | ⋮ | ⋮ |
| 9 | — | ○ |
| 0 | — | ○ |
| # | — | ○ |
| ⋮ | ⋮ | ⋮ |
| △ | ○ | — |
| ▷ | ○ | — |
| ▽ | ○ | — |
| ◁ | ○ | — |
| DECI-SION | ○ | — |
| RETURN | ○ | — |
| MENU | — | — |
| ⋮ | ⋮ | ⋮ |
| POWER | — | — |
| ⋮ | ⋮ | ⋮ |

OVERALL CONFIGURATION OF EVENT CONTROL DEVICE (3RD EMBODIMENT)

FIG.15

DELIVERY PRIORITY INFORMATION

| | INTERNET BROWSER | E-MAIL | TUNING |
|---|---|---|---|
| 1 | 1 | — | 2 |
| 2 | 1 | — | 2 |
| 3 | 1 | — | 2 |
| ⋮ | ⋮ | ⋮ | ⋮ |
| 9 | 1 | — | 2 |
| 0 | 1 | — | 2 |
| # | 2 | 1 | 3 |
| ⋮ | ⋮ | ⋮ | ⋮ |
| △ | 2 | 1 | — |
| ▷ | 2 | 1 | — |
| ▽ | 2 | 1 | — |
| ◁ | 2 | 1 | — |
| DECI-SION | 2 | 1 | — |
| RETURN | 2 | 1 | — |
| MENU | — | — | — |
| ⋮ | ⋮ | ⋮ | ⋮ |
| POWER | — | — | — |
| ⋮ | ⋮ | ⋮ | ⋮ |

FIG.16

EVENT RECEPTION SPECIFYING INFORMATION

| | INTERNET BROWSER | E-MAIL | TUNING |
|---|---|---|---|
| 1 | — | — | ○ |
| 2 | — | — | ○ |
| 3 | — | — | ○ |
| ⋮ | ⋮ | ⋮ | ⋮ |
| 9 | — | — | ○ |
| 0 | — | — | ○ |
| # | ○ | ○ | — |
| ⋮ | ⋮ | ⋮ | ⋮ |
| △ | ○ | ○ | — |
| ▷ | ○ | ○ | — |
| ▽ | ○ | ○ | — |
| ◁ | ○ | ○ | — |
| DECI-SION | ○ | ○ | — |
| RETURN | ○ | ○ | — |
| MENU | — | — | — |
| ⋮ | ⋮ | ⋮ | ⋮ |
| POWER | — | — | — |
| ⋮ | ⋮ | ⋮ | ⋮ |

FIG.17

EVENT RECEPTION SPECIFYING INFORMATION

| | INTERNET BROWSER | TUNING |
|---|---|---|
| 1 | — | ○ |
| 2 | — | ○ |
| 3 | — | ○ |
| ⋮ | ⋮ | ⋮ |
| 9 | — | ○ |
| 0 | — | ○ |
| # | ○ | ○ |
| ⋮ | ⋮ | ⋮ |
| △ | ○ | — |
| ▷ | ○ | — |
| ▽ | ○ | — |
| ◁ | ○ | — |
| DECISION | ○ | — |
| RETURN | ○ | — |
| MENU | — | — |
| ⋮ | ⋮ | ⋮ |
| POWER | — | — |
| ⋮ | ⋮ | ⋮ |

FIG.21

EVENT RECEPTION SPECIFYING INFORMATION

| | INTERNET BROWSER | TUNING |
|---|---|---|
| 1 | O | O |
| 2 | O | O |
| 3 | O | O |
| ⋮ | ⋮ | ⋮ |
| 9 | O | O |
| 0 | O | O |
| # | O | O |
| ⋮ | ⋮ | ⋮ |
| △ | O | — |
| ▷ | O | — |
| ▽ | O | — |
| ◁ | O | — |
| DECI-SION | O | — |
| RETURN | O | — |
| MENU | — | — |
| ⋮ | ⋮ | ⋮ |
| POWER | — | — |
| ⋮ | ⋮ | ⋮ |

FIG.22

DELIVERY PRIORITY INFORMATION

| | INTERNET BROWSER | E-MAIL | TUNING |
|---|---|---|---|
| NUMERAL | 1 | — | 2 |
| CURSOR | 2 | 1 | — |
| ⋮ | ⋮ | ⋮ | ⋮ |
| ⋮ | ⋮ | ⋮ | ⋮ |

FIG.23

EVENT RECEPTION SPECIFYING INFORMATION

| | INTERNET BROWSER | E-MAIL | TUNING |
|---|---|---|---|
| NUME-RAL | — | — | ○ |
| CUR-SOR | ○ | ○ | — |
| ⋮ | ⋮ | ⋮ | ⋮ |
| ⋮ | ⋮ | ⋮ | ⋮ |

FIG.24

EVENT GROUPING INFORMATION

| | NUMERAL | CURSOR | ---- |
|---|---|---|---|
| 1 | ○ | — | ---- |
| 2 | ○ | — | ---- |
| 3 | ○ | — | ---- |
| ⋮ | ⋮ | ⋮ | ---- |
| 9 | ○ | — | ---- |
| 0 | ○ | — | ---- |
| # | ○ | — | ---- |
| ⋮ | ⋮ | ⋮ | ---- |
| △ | — | ○ | ---- |
| ▷ | — | ○ | ---- |
| ▽ | — | ○ | ---- |
| ◁ | — | ○ | ---- |
| DECI-SION | — | ○ | ---- |
| RETURN | — | — | ---- |
| MENU | — | — | ---- |
| ⋮ | ⋮ | ⋮ | ---- |
| POWER | — | — | ---- |
| ⋮ | ⋮ | ⋮ | ⋮ |

OVERALL CONFIGURATION OF EVENT CONTROL DEVICE (4TH EMBODIMENT)

FIG.26

DELIVERY PROPERTY INFORMATION

| | INTERNET BROWSER | E-MAIL | TUNING |
|---|---|---|---|
| 1 | — | — | — |
| 2 | — | — | — |
| 3 | — | — | — |
| ⋮ | ⋮ | ⋮ | ⋮ |
| 9 | — | — | — |
| 0 | — | — | — |
| # | SHARE(OVER) | SHARE | — |
| ⋮ | ⋮ | ⋮ | ⋮ |
| △ | SHARE(OVER) | SHARE | — |
| ▷ | SHARE(OVER) | SHARE | — |
| ▽ | SHARE(OVER) | SHARE | — |
| ◁ | SHARE(OVER) | SHARE | — |
| DECI-SION | SHARE(OVER) | SHARE | — |
| RETURN | SHARE(OVER) | SHARE | — |
| MENU | — | — | — |
| ⋮ | ⋮ | ⋮ | ⋮ |
| POWER | — | — | — |
| ⋮ | ⋮ | ⋮ | ⋮ |

OVERALL CONFIGURATION OF EVENT CONTROL DEVICE (5TH EMBODIMENT)

FIG.29

APPLICATION STARTUP INFORMATION

| INTERNET BROWSER | E-MAIL | TUNING |
|---|---|---|
| ○ | — | ○ |

○:ACTIVE
—:NOT ACTIVE

OVERALL CONFIGURATION OF
EVENT CONTROL DEVICE (6TH EMBODIMENT)

FIG.31

EVENT EXECUTING INFORMATION

| | INTERNET BROWSER | E-MAIL | TUNING |
|---|---|---|---|
| 1 | ○ | ○ | — |
| 2 | ○ | ○ | — |
| 3 | ○ | ○ | — |
| ⋮ | ⋮ | ⋮ | ⋮ |
| 9 | ○ | ○ | — |
| 0 | ○ | ○ | — |
| # | — | ○ | ○ |
| ⋮ | ⋮ | ⋮ | ⋮ |
| △ | — | — | ○ |
| ▷ | — | — | ○ |
| ⋮ | ⋮ | ⋮ | ⋮ |

OVERALL CONFIGURATION OF TRANSMITTER
(7TH EMBODIMENT)

OVERALL CONFIGURATION OF RECEIVER
(7TH EMBODIMENT)

CONSTITUTION DETAILS OF TRANSMITTER
(7TH EMBODIMENT)

PACKETED DATA STRUCTURE

FIG.39

NIT

| TS | TRANSFER SPEC | SERVICE LIST |
|---|---|---|
| TS1 | f1 | SV1、SV2 |
| TS2 | f2 | SV21、SV22、SV23、SV24 |
| ⋮ | ⋮ | ⋮ |

FIG.40

HTML DATA

```
<html><]head>
```

510

```
<style type="text/css">
 @media:tv{
    keylist::"number.basic"
    #img1{  position:absolute;
              left:100px;top:100px;width:200px;height:200px; }
    #text{ position:absolute;
              left:100px;top:500px;width:200px;height:100px; }
    #button1{ position:absolute;
              left:500px;top:500px;width:150px;height:50px; }
    #button2{ position:absolute;
              left:500px;top:600px;width:150px;height:50px; }
  }
</style>
<script>
   function  img1Goto()
   {
             location.href="http://aaa/bbb/ccc/s2.html";
   }
   function  img2Goto()
   {
             location.href="http://aaa/bbb/ccc/s3.html";
   }
</script></head>
```

512

```
<body>
  <object id="img1"type="image/png"
             src="http://aaa/bbb/ccc/why.png">
  </object>
  <object id="text"type="text/plain"
             THIS IS TEST1<p>
             THIS IS TEST2
  </object>
   <input id="button1"type="image/png"
             src="http://aaa/bbb/ccc/b1.png">
             onclick="img1Goto()"
             accesskey="1">
   </input>
   <input id="button2"type="image/png"
             src="http://aaa/bbb/ccc/b2.png">
             onclick="img2Goto()"
             accesskey="2">
   </input>
<body>
```

HARDWARE CONFIGURATION OF DIGITAL BROADCASTING DEVICE

FIG.42

RECEIVABLE EVENT TABLE

| | |
|---|---|
| 1 | ○ |
| 2 | ○ |
| 3 | ○ |
| ⋮ | ⋮ |
| 9 | ○ |
| 0 | ○ |
| # | — |
| ⋮ | ⋮ |
| △ | ○ |
| ▷ | ○ |
| ▽ | ○ |
| ◁ | ○ |
| DECI-SION | ○ |
| RETURN | — |
| MENU | — |
| ⋮ | ⋮ |
| POWER | — |
| ⋮ | ⋮ |

OVERALL CONFIGURATION OF RECEIVER

OVERALL CONFIGURATION OF TRANSMITTER (8TH EMBODIMENT)

OVERALL CONFIGURATION OF RECEIVER
(8TH EMBODIMENT)

```
<html><]head>
<style type="text/css">
 keylist:"basic"
 #text{ position:absolute;
          left:300px;top:50px;width:200px;height:50px; }
 #isge{ position:absolute;
          left:500px;top:300px;width:300px;height:50px; }
   #man{ position:absolute;
          left:400px;top:600px;width:30px;height:30px; }
   #woman{ position:absolute;
          left:600px;top:600px;width:30px;height:30px; }
 #best{ position:absolute;
          left:400px;top:700px;width:50px;height:30px; }
 #better{ position:absolute;
          left:400px;top:800px;width:50px;height:30px; }
 #poor{ position:absolute;
          left:400px;top:900px;width:50px;height:30px; }
</style><script>
   function funcage1(){
          thisdocument.style.keylist="number.basic";     }
   function funcage2(){
          thisdocument.style.keylist="basic"; }
</script></head>
```

512

```
<body>
   <object id="text"type="text/plain"
            TV INQUIRY
   </object>
</body>
<form>
   AGE :
  <input id="age"type="text"onfocus="funcage1"onblur="funcage2">
  </input>
    SEX :
  <input id="man"type="radio"name= "sex" value="man"> MALE </input>
  <input id="woman"type="radio"name= "sex" value="woman"> FEMALE </input>
  PROGRAM IMPRESSION : <p>
  <input id= "best" type= "radio"name= "prog" value= "best"> VERY INTERESTING
  </input>
  <input id= "good" type= "radio" name= "prog"value= "better"> INTERESTING
  </input>
  <input id= "poor" type= "radio" name= "prog"value= "poor"> DULL
  </input>
<form>
```

FIG.48

RECEIVABLE EVENT TABLE

| | |
|---|---|
| 1 | — |
| 2 | — |
| 3 | — |
| ⋮ | ⋮ |
| 9 | — |
| 0 | — |
| # | — |
| ⋮ | ⋮ |
| △ | ○ |
| ▷ | ○ |
| ▽ | ○ |
| ◁ | ○ |
| DECI-SION | ○ |
| RETURN | — |
| MENU | — |
| ⋮ | ⋮ |
| POWER | — |
| ⋮ | ⋮ |

```
┌─────────────────────────────┐
│  ┌───────────────────────┐  │
│  │      TV INQUIRY       │  │
│  └───────────────────────┘  │
│                             │
│   AGE:    ┌──────┐          │
│           └──────┘          │
│   ▓SEX:▓   ○ MALE   ○ FEMALE│
│                             │
│   PROGRAM WAS:              │
│                             │
│         ○ VERY INTERESTING  │
│                             │
│         ○ INTERESTING       │
│                             │
│         ○ DULL              │
│                             │
└─────────────────────────────┘
```

```
┌─────────────────────────────────────┐
│  ┌───────────────────────────────┐  │
│  │         TV INQUIRY            │  │
│  └───────────────────────────────┘  │
│                                     │
│   ▨▨▨▨    ┌──────────┐              │
│   ▨AGE▨   │    12    │              │
│   ▨▨▨▨    └──────────┘              │
│                                     │
│   SEX:    ○ MALE    ○ FEMALE        │
│                                     │
│   PROGRAM WAS:                      │
│                                     │
│            ○ VERY INTERESTING       │
│                                     │
│            ○ INTERESTING            │
│                                     │
│            ○ DULL                   │
│                                     │
└─────────────────────────────────────┘
```

HARDWARE CONFIGURATION OF DIGITAL BROADCAST RECEIVER

DIGITAL BROADCAST RECEIVER FOR A DIGITAL BROADCASTING SYSTEM

CROSS REFERENCE TO RELATED APPLICATIONS

The entire disclosure of the Japanese patent application No. Hei 11-106739, filed on Apr. 14, 1999, including its specification, claims, drawings, and abstract is incorporated herein by reference.

This application is divisional of U.S. patent application Ser. No. 09/548,744, filed on Apr. 13, 2000, now U.S. Pat. No. 6,711,620.

FIELD OF THE INVENTION

This invention relates to event control, and more specifically to automated delivery of events.

BACKGROUND OF THE INVENTION

In a window system for personal computers or the like, when a plural number of windows are running, to which of the windows the inputs entered through a mouse or a keyboard (event signals, or events) should be given must be determined. Conventionally, an operating system controls to give events to windows that are chosen and activated by an operator.

However, the operation with such a method is cumbersome because the operator must choose and activate an intended window or windows by the use of the mouse, etc.

To solve the above problem, JP-A-Hei 5-11962 proposes to keep a list of windows that can be activated, so that windows are switched sequentially by pressing a specific key. This enables the user to switch windows simply by pressing the specific key. This has put to practical use a simpler method of switching windows than choosing windows by the use of a mouse.

However, even with this conventional art, that the user is required to operate the key is still cumbersome. Using the conventional window system in particular to household-dedicated appliances such as a TV set poses a problem because the operation is required to be simple.

An object of the invention is to provide a technique for solving the above-described problem, making it possible to determine delivery destinations of events without requiring choosing operations by the operator.

Another object of the invention is to provide a technique that enables delivery destinations of events to be changed flexibly.

SUMMARY OF THE INVENTION (1) The event control device of this invention comprises an event input means for inputting events, a delivery destination determining information storing section storing the delivery destination determining information indicating for every application to which application an event in question should be delivered according to the contents of the event, and a delivery destination determining means for determining to which application the event should be delivered according to the contents of the event and on the basis of the delivery destination determining information and delivering the event accordingly.

Therefore, an event can be delivered to an appropriate application according to the contents of the event, even without the operator choosing an addressed application.

(2) The event control device of this invention is adapted to record the degrees of priority of delivery as delivery destination determining information. Therefore, an event can be delivered to an appropriate application according to the priority degree.

(3) The event control device of this invention further comprises a delivery destination determining information changing means for acquiring information on which application is currently active and for changing the delivery destination determining information on the basis of the acquired information. Therefore, an addressed application may be flexibly changed depending on which application is in operation.

(4) The event control device of this invention is characterized in that the delivery destination determining information storing section comprises an event reception specifying section storing information on whether the event in question should be received or not, according to the contents of respective events, and a delivery priority degree storing section storing delivery priority degree information on to which application the event should be delivered preferentially and in that the delivery destination determining means determines the application to which the event should be delivered and delivers the event on the basis of the description in the event reception specifying section and the delivery priority degree storing section.

Since the event reception specification and the delivery priority degrees are stored separately, delivery destinations may be changed flexibly according to combinations of two pieces of information.

(5) The event control device of this invention further comprises an event reception specification changing means for acquiring information on which application is currently in operation and for changing the description in the event reception specifying section according to changes in the currently operating application.

Since it is arranged that only the application currently in operation is described as the delivery destination of the event to be received, an addressed application is determined quickly.

(6) The event control device of this invention is characterized in that the event reception specification changing means also carries out the process of changing the description in the event reception specifying section according to current operating statuses of respective applications.

Therefore, an addressed application may be flexibly changed according to the operating statuses of respective applications and an appropriate application may be chosen as the addressed application according to the situation.

(6) The event control device of this invention is characterized in that the event reception specification changing means receives description changing instructions from respective applications and carries out the process of changing the description in the event reception specifying section.

Therefore, which event may be received can be specified from the application side. That is to say, it is possible to determine events to be received according to the progress in the process of an application when the application is created.

(7) The event control device of this invention is characterized in that the delivery destination determining information storing section comprises a basic delivery destination storing section in which are described applications to be the basic delivery destinations for respective contents of respective events, and that the delivery destination determining means, in the case an application to which an inputted event may be delivered is not specified in the event reception specification section, delivers the event to the application of the basic delivery destination described in the basic delivery destination storing section.

Therefore, even if the delivery destination of an event is not described in the event reception specifying section, an application of the basic delivery destination may be determined as the delivery destination. Therefore, in whatever status, a status in which no delivery destination application is present can be avoided.

(8) The event control device of this invention further comprises a delivery priority degree changing means for acquiring information on which application is currently in operation and for changing the priority degree in the delivery priority degree storing section according to the change in the currently operating application.

Therefore, the delivery priority degree can be changed depending on which application is currently in operation and an appropriate delivery destination application can be chosen according to the situation.

(10) The event control device of this invention is characterized in that the delivery priority degree changing means changes the priority degree in the delivery priority degree storing section in consideration of current statuses of operation of respective applications.

Therefore, the delivery priority degree can be changed according to the operating statuses of respective applications and an appropriate delivery destination application can be chosen according to the situation.

(11) The event control device of this invention is characterized in that a plural number of delivery priority degree tables are stored in the delivery priority degree storing section corresponding to combinations of applications in operation, and that the delivery priority degree changing means changes the priority degree by choosing a corresponding delivery priority degree table according to changes in the applications in operation.

Therefore, an appropriate delivery priority degree table may be quickly chosen and used.

(A) The event control device of this invention is characterized in that the delivery priority degree changing means receives the combinations of applications in operation or current operating statuses of respective applications and when they are in agreement with predetermined conditions, changes the delivery priority degree of the delivery priority degree storing section, and when in disagreement with the predetermined conditions, does not change the delivery priority degree of the delivery priority degree storing section.

Therefore, the delivery priority degree can be changed only in such an exceptional case in which the delivery priority degrees to be criteria are stored and kept and the process status is in agreement with the predetermined conditions.

(12) The event control device of this invention is characterized in that the delivery destination determining information storing section comprises a delivery property storing section for storing delivery properties of events respective applications receive, and that the delivery destination determining means determines the application to which the event is delivered in consideration of also the delivery properties stored in the delivery property storing section.

Therefore, events can be appropriately delivered to respective applications according to the delivery properties.

(13) The event control device of this invention is characterized in that the delivery properties show whether an event in question can be received also with other applications.

Therefore, whether or not the event is to be delivered simultaneously to a plural number of applications can be appropriately determined.

(14) The event control device of this invention is characterized by further comprising a delivery property changing means for changing the delivery properties of the delivery property storing section according to the operating statuses of respective applications.

Therefore, whether or not the event is to be delivered simultaneously to a plural number of applications can be appropriately changed according to the situation.

(15) The event control device of this invention is characterized in that a plural number of events are grouped into event groups, that the delivery destination determining information storing section stores delivery destination determining information showing to which application an event belonging to an event group should be delivered for respective applications by priority degrees, and that the delivery destination determining means determines to which application the event should be delivered according to the priority degree stored in the delivery destination determining information storing section and delivers the event accordingly.

Therefore, a plural number of events can be arranged into groups to control the delivery destination applications.

(16) The event control device of this invention further comprises an event group changing means for changing the grouping of events according to the operating statuses of respective applications.

Therefore, events to be grouped can be appropriately changed according to the situation.

(17) The event control device of this invention is characterized in that a plural number of applications are grouped into application groups, that the delivery destination determining information storing section stores delivery destination determining information showing to which application group an event in question should be delivered for each application group by the priority degrees, that the delivery destination determining means determines according to the inputted event to which application group the event should be delivered based on the priority degrees stored in the delivery destination determining information storing section, and delivers the event to the application belonging to the application group.

Therefore, delivery of events can be controlled by arranging a plural number of applications into groups.

(18) The event control device of this invention further comprises an application group changing means for changing the grouping of applications according to the operating statuses of respective applications.

Therefore, applications to be grouped can be appropriately changed according to the situation.

(19) The event control device of this invention is characterized in that each application controls itself to writes information on whether itself is activated or not in the delivery destination determining information storing section.

Therefore, the delivery destination determining means can determine the delivery destination of an event in consideration of the statuses of respective applications stored in the delivery destination determining information storing section.

(23) The event control device of this invention is characterized in that the device is capable of operating a plural number of applications and determining which application should execute the inputted event, that it comprises an event execution information recording section for recording event execution information showing in which application the inputted event should be executed according to the contents of the event, and an event delivery means for delivering a given event to at least currently operating application, and that the respective applications that have received events from the event delivery means determine whether or not the received events should be executed in reference to the recorded contents in the event execution information recording section.

Therefore, the respective applications themselves can determine whether or not to execute the received events in reference to the event execution information.

(24) The event control device of this invention is characterized in that respective applications control to write as event execution information whether or not the respective applications are in operation.

Therefore, applications for executing events can be dynamically changed according to which applications are in operation.

(25) The event control device of this invention is characterized in that each application records the current status of its own operation in the application operation recording section and each application that has received an event from the event delivery means determines whether or not the event it received should be executed in consideration of the current operating status of the application recorded in the application operation recording section.

Therefore, whether or not the event should be executed can be determined in consideration of the current operating status of each application.

(27) The digital broadcasting system of this invention is characterized in that a transmitter comprises a multiplexing means for creating multiplex data by multiplexing receivable event information describing events receivable on a receiver side into contents, and a transmitting means for transmitting the multiplex data, a receiver comprises a receiving means for receiving the multiplex data, an event input means for receiving events from an operator, and a demultiplexing means provided with an interactive demultiplexing application for demultiplexing the multiplex data received with the receiving means and for carrying out the process of changing the contents to be demultiplexed, and that the demultiplexing means, based on the receivable event information it has received, chooses receivable events out of events inputted from the event inputting means and gives them to the interactive demultiplexing application.

Therefore, it is possible from the transmitter side to control events to be made receivable and events to be made not receivable on the receiver side.

(29) The transmitter of this invention is characterized by comprising a multiplexing means for creating multiplex data by multiplexing receivable event information describing events receivable on a receiver side into contents, and a transmitting means for transmitting the multiplex data.

Therefore, it is possible from the transmitter side to control events to be made receivable and events to be made not receivable on the receiver side.

(30) The digital transmitter of this invention is characterized in that the multiplexing means multiplexes the receivable event changing information for changing the receivable events based on specified conditions.

Therefore, it is possible from the transmitter side to change events to be made receivable and events to be made not receivable on the receiver side.

(31) The digital transmitter of this invention is characterized in that the contents are described in a self-descriptive type of language and that the receivable event information is described as definition information on the self-descriptive type of language.

Therefore, it is possible from the transmitter side to easily control events to be made receivable and events to be made not receivable on the receiver side in data broadcasting, etc.

(32) The digital transmitter of this invention is characterized in that the receivable event changing information is described as major information of a self-descriptive type of language.

Therefore, it is possible from the transmitter side to easily change events to be made receivable and events to be made not receivable on the receiver side in data broadcasting, etc.

(34) The receiver of this invention is characterized in that it comprises a receiving means for receiving the multiplex data, an event input means for receiving events from an operator, and a demultiplexing means provided with an interactive demultiplexing application for carrying out the processes of demultiplexing the multiplex data received with the receiving means and changing the contents to be demultiplexed, and that the demultiplexing means, based on the receivable event information it has received, chooses receivable events out of events inputted from the event inputting means and gives them to the interactive demultiplexing application.

Therefore, it is possible from the transmitter side to determine events to be made receivable and events to be made not receivable based on the control from the transmitter side.

(35) The digital receiver of this invention is characterized in that the demultiplexing means changes the receivable events based on the receivable event changing information it has received.

Therefore, the events to be made receivable and the events to be made not receivable can be changed based on the control from the transmitter side.

(41) The digital receiver of this invention is characterized in that it receives multiplex data, demultiplexes and displays the received multiplex data according to the operation of an operator, changes a program by means of a communication line or broadcast reception according to the operation of the operator, or changes a program by replacing a recording medium recording the program, and carries out different displaying processes before and after the program change for the same operation by the operator.

Therefore, in the status of the same application is activated, even if the operator operates in the same manner, the contents of the process may be changed automatically by changing the program, so that different displays can be produced.

(44) The digital transmission system of this invention is characterized in that a transmitter comprises a multiplexing mans for creating multiplex data by multiplexing delivery destination determining information into contents, and a transmitting means for transmitting the multiplex data, a receiver comprises a receiving means for receiving the multiplex data, an event input means for receiving events from an operator, and a demultiplexing means provided with a plural number of applications including a demultiplexing application for demultiplexing multiplex data received through the receiving means into contents, and the demultiplexing means determines to which application the inputted event should be delivered according to the contents of the inputted event and based on the delivery destination determining information it has received.

Therefore, a broadcasting system can be provided that is capable of controlling from the transmitter side the delivery destination of the event on the receiver side.

(45) The transmitter of this invention comprises a multiplexing means for creating multiplex data by multiplexing the delivery destination determining information into contents, and a transmitting means for transmitting the multiplex data.

Therefore, a transmitter can be provided that is capable of controlling from the transmitter side the delivery destination of the event on the receiver side.

(46) The receiver of this invention is characterized in that it comprises a receiving means for receiving multiplex data, an event input means for receiving events from an operator, and a demultiplexing means provided with a plural number of applications including a demultiplexing application for demultiplexing the multiplex data received through the receiving means into contents, and the demultiplexing means determines to which application the event is to be delivered according to the contents of the event entered and on the basis of the delivery destination determining information it has received.

Therefore, an application to which an event is to be delivered can be determined based on the delivery destination determining information sent from the receiver.

The terms used for describing the invention will be hereinafter explained.

"Event" refers to an incident given to an application, program, etc. and is a concept including the depression of a key, movement of a mouse, click on the mouse, reception of data, etc.

"Delivery destination determining information" refers to the information for determining to which application an event should be delivered and is information including not only that expressed in the form of a table or the like but also that obtained by calculation process or the like. In the embodiments, this includes the following types of information; event reception specifying information, delivery priority degree information, basic delivery destination information, delivery property information, receivable event information, receivable event changing information, application startup information, etc.

"Delivery destination determining means" refers to the means for determining the delivery destination of an event. In the embodiments, the event control program of FIG. 3, the event control program (for determining delivery destination) of FIG. 13, etc. correspond to this.

"Event reception specification changing means" refers to the means for substantially changing the event reception specification information used, and is means for such cases as including choosing a piece of information for use from a plural pieces of event reception specifying information prepared in advance, rewriting the contents of the event reception specifying information, etc. In the embodiments, the event control program (for controlling the delivery destination information), etc. of FIG. 12 correspond to this.

"Delivery priority degree changing means" refers to the means for substantially changing the delivery priority degree information used, and is a concept including such cases; as preparing a plural pieces of delivery priority degree information and choosing one for use, rewriting the contents of the delivery priority degree information, etc.

"Delivery property information changing means" refers to the means for substantially changing the delivery property information for use, and is a concept including such cases; as preparing a plural pieces of delivery property information and choosing one for use, rewriting the contents of the delivery property information, etc.

"Interactive demultiplexing application" refers to an application for carrying out a process accompanied by some reactions in the output contents responsive to the input operation by a viewer (an operator), and is a concept including not only the cases of changing screen display and voice output but also the cases of changes in the internal process, etc. even without any change in the screen display and voice output. This includes also an application for displaying an electronic program table, and an application for station tuning responsive to the operation of a user. In the embodiments, the browser application corresponds to this.

"Recording medium recording a program" refers to any recording medium such as ROM, RAM, flexible disk, CD-ROM, memory card, hard disk, etc. on which programs are recorded, and is a concept including communication media such as telephone lines and transfer paths (carrier paths). This concept includes not only such recording media as the hard disk connected to a CPU with programs recorded on it directly executed but also such recording media as CD-ROM recording a program that is once installed in a hard disk and then executed. Further, the programs referred to here include not only those which can be directly executed but also those of source type, compression-processed programs, encrypted programs, etc.

The features, other objects, applications, effects, etc. will become apparent in reference to the following description on embodiments and appended drawings.

BRIEF DESCRIPTION OF THE DRAWINGS

FIG. 4 shows delivery destination determining information.

FIG. 10 shows event reception specifying information.

FIG. 11 shows event reception specifying information.

FIG. 15 shows delivery priority degree information.

FIG. 16 shows event reception specifying information.

FIG. 17 shows event reception specifying information.

FIG. 21 shows event reception specifying information.

FIG. 22 shows delivery priority degree information.

FIG. 23 shows event reception specifying information.

FIG. 24 shows event grouping information.

FIG. 26 shows delivery property (attribute) information.

FIG. 29 shows application startup information.

FIG. 31 shows event executing information.

FIG. 39 shows control data NIT.

FIG. 40 shows HTML data.

FIG. 42 shows a receivable event table.

FIG. 47 shows HTML data.

FIG. 48 is a receivable event table.

DETAILED DESCRIPTION OF THE INVENTION

1. FIRST EMBODIMENT

Figure 1:
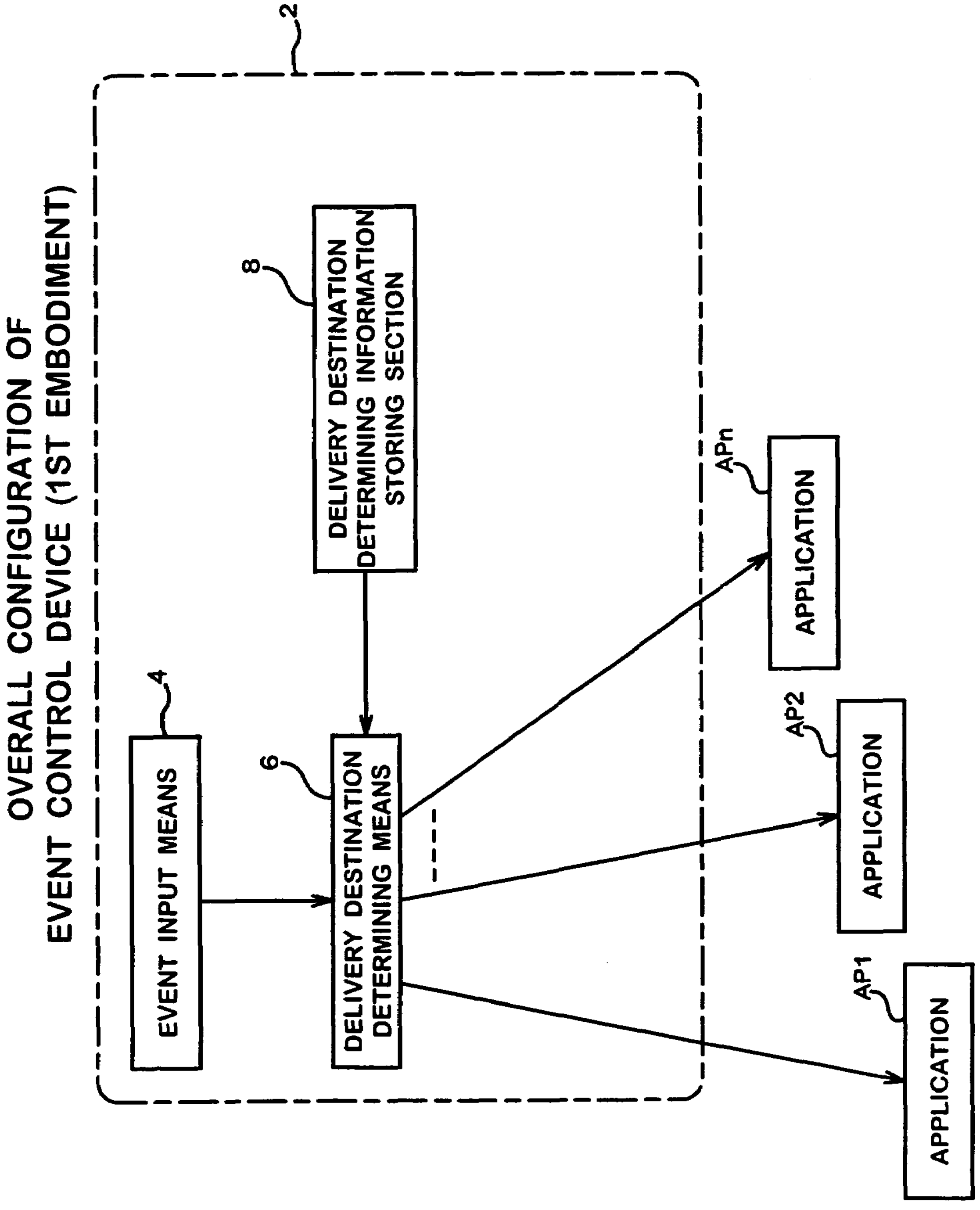
FIG. 1 shows an overall configuration of an event control device as a first embodiment of the invention.

FIG. 1 shows an overall configuration of an event control device 2 as a first embodiment of the invention. An event entered through an event input means 4 is given to a delivery destination determining means 6. The delivery destination determining means 6 determines to which of applications AP1, AP2, . . . , APn the event given should be delivered according to the contents of the event and delivery destination determining information stored in a delivery destination determining information storing section 8, and delivers accordingly.

Figure 2:
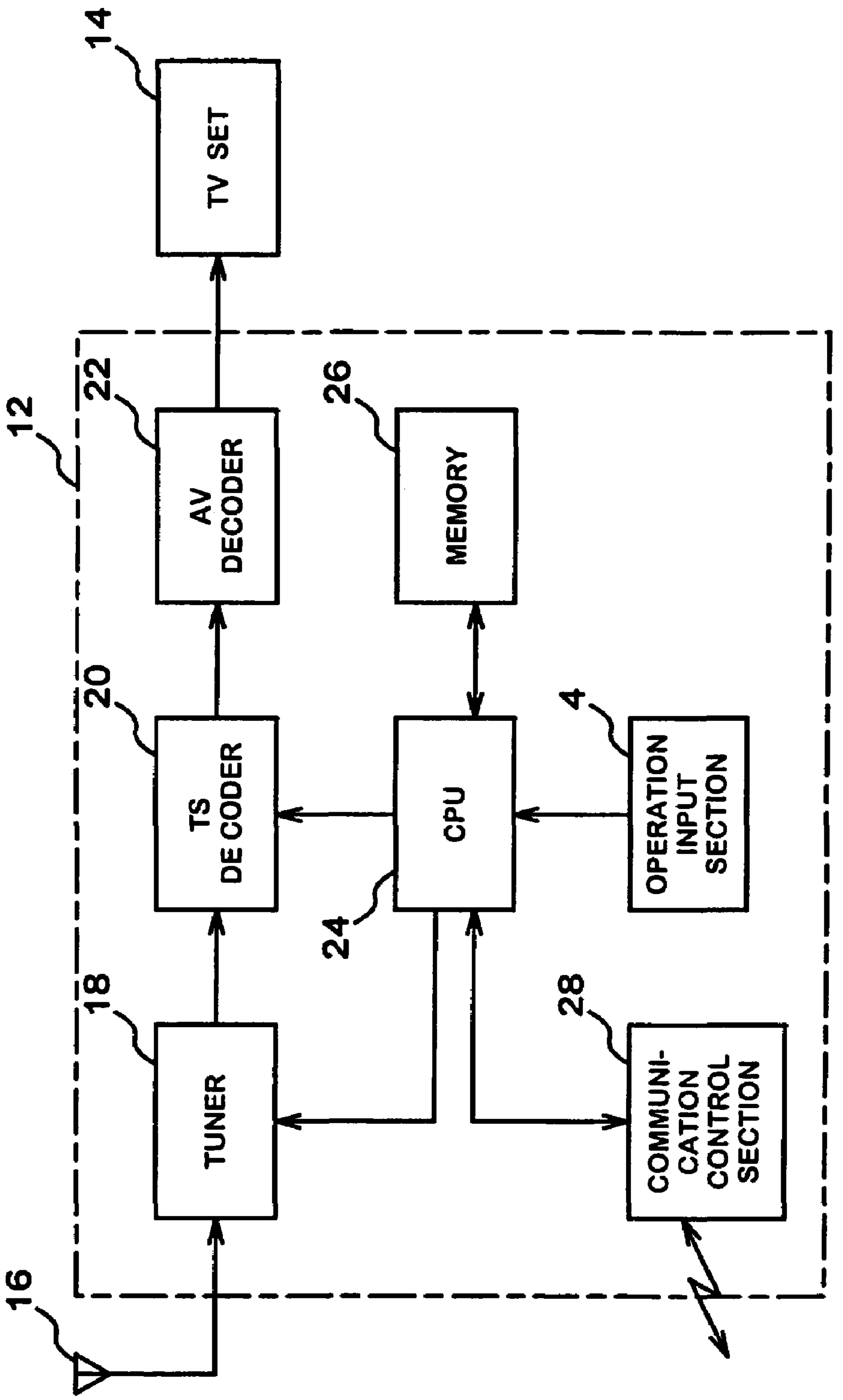
FIG. 2 shows a hardware configuration of a digital broadcast receiver.

FIG. 2 shows a hardware configuration in which the event control device 2 of FIG. 1 is applied to a digital broadcast receiver 12. While in this and other embodiments described hereinafter, the digital broadcast receiver is used as an example to which the event control device of the invention is applied, the invention may also be applied to devices with which events addressed to applications must be controlled. Such devices include audio apparatuses, personal computers, etc.

Electromagnetic waves caught with an antenna 16 are given to a tuner 18. The tuner 18 chooses a transport stream according to the control with a CPU 24. A plural number of services are multiplexed in one transport stream. A transport decoder (TS decoder) 20 tunes to one service and gives out outputs according to the control with the CPU 24. The outputs from the transport decoder 20 are given to an AV decoder 22, and converted into NTSC composite signals, etc. The NTSC composite signals are outputted as images and voices with a TV set 14.

Figure 8:
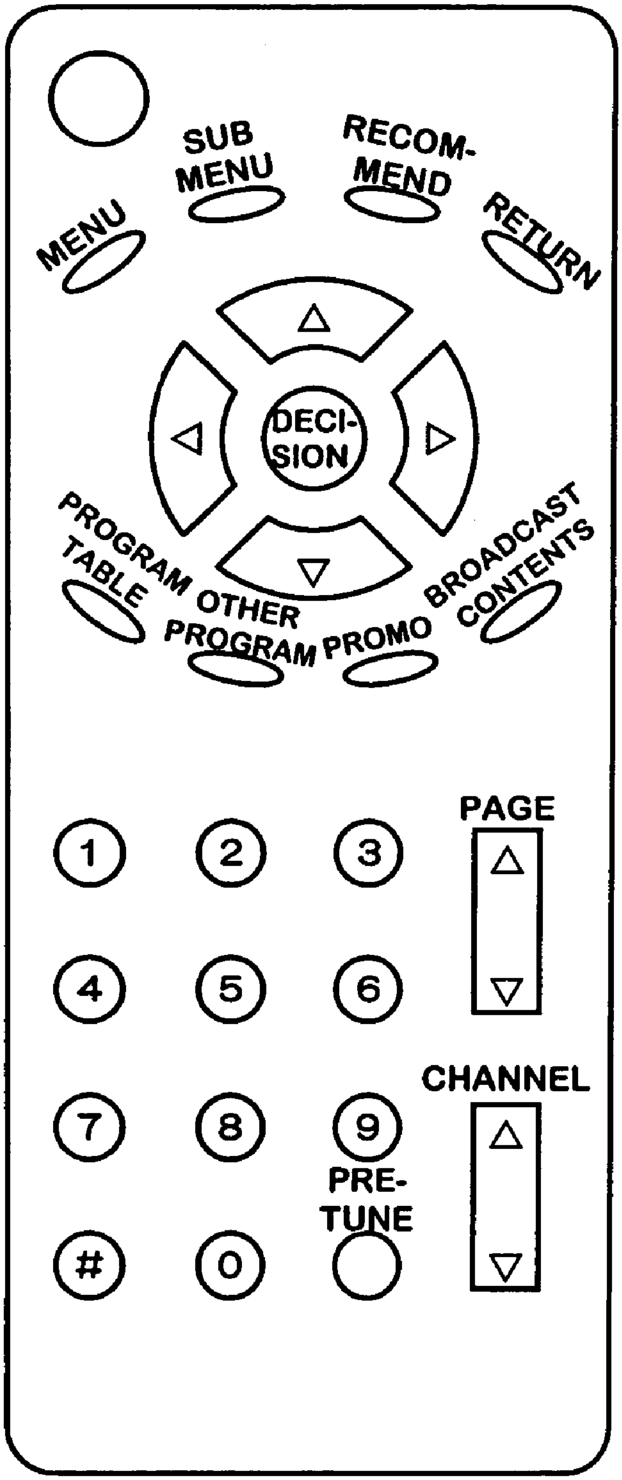
FIG. 8 shows an external view of a remote control device.

The CPU 24 controls the tuner 18 and the TS decoder 20 according to a tune-in application (program) recorded in a memory 26 (constituted with a read-only memory (ROM), random access memory (RAM), etc.), and tunes in a service station according to the event entered through the operation input section 4. The operation input section 4 is a receiving section for receiving instructions from a remote control or an operation entering button provided at the receiver 12. In this embodiment, events are entered with a remote control having buttons as shown in FIG. 8.

In the memory 26 are also recorded an internet browser application and an e-mail application, as well as the tune-in application. In addition to those programs, a system program (operating system) for controlling the above programs is also recorded. The internet browser application is for going through data from the internet connected through a communication control section 28. The e-mail application is for exchanging mails also through the internet. The startup, finish, and operation of the internet browser and the e-mail application are carried out by the events entered through the operation input section 4.

In the memory 26 is also recorded delivery priority degree information as shown in FIG. 4. The delivery priority degree information shows to which application respective events should be given depending on the contents of the events in the order of priority. The CPU 24 refers to the delivery priority information according to the event control program recorded in the memory 26 and delivers the event entered through the operation input section 4 to one of the applications. A flowchart of an event control program recorded in the memory 26 is shown in FIG. 3.

Figure 5:
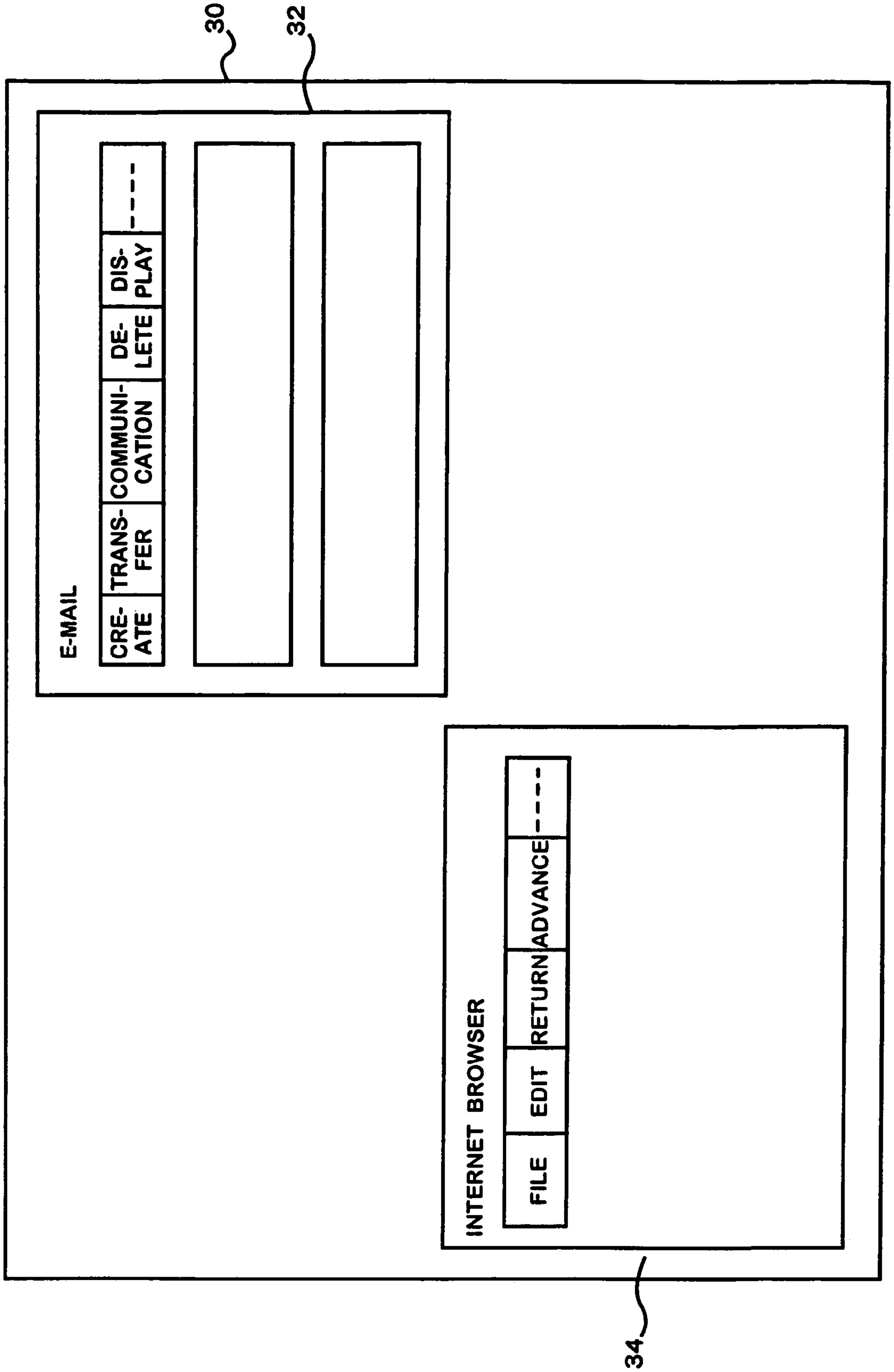
FIG. 5 shows a status of a plural number of windows open.
Figure 6:
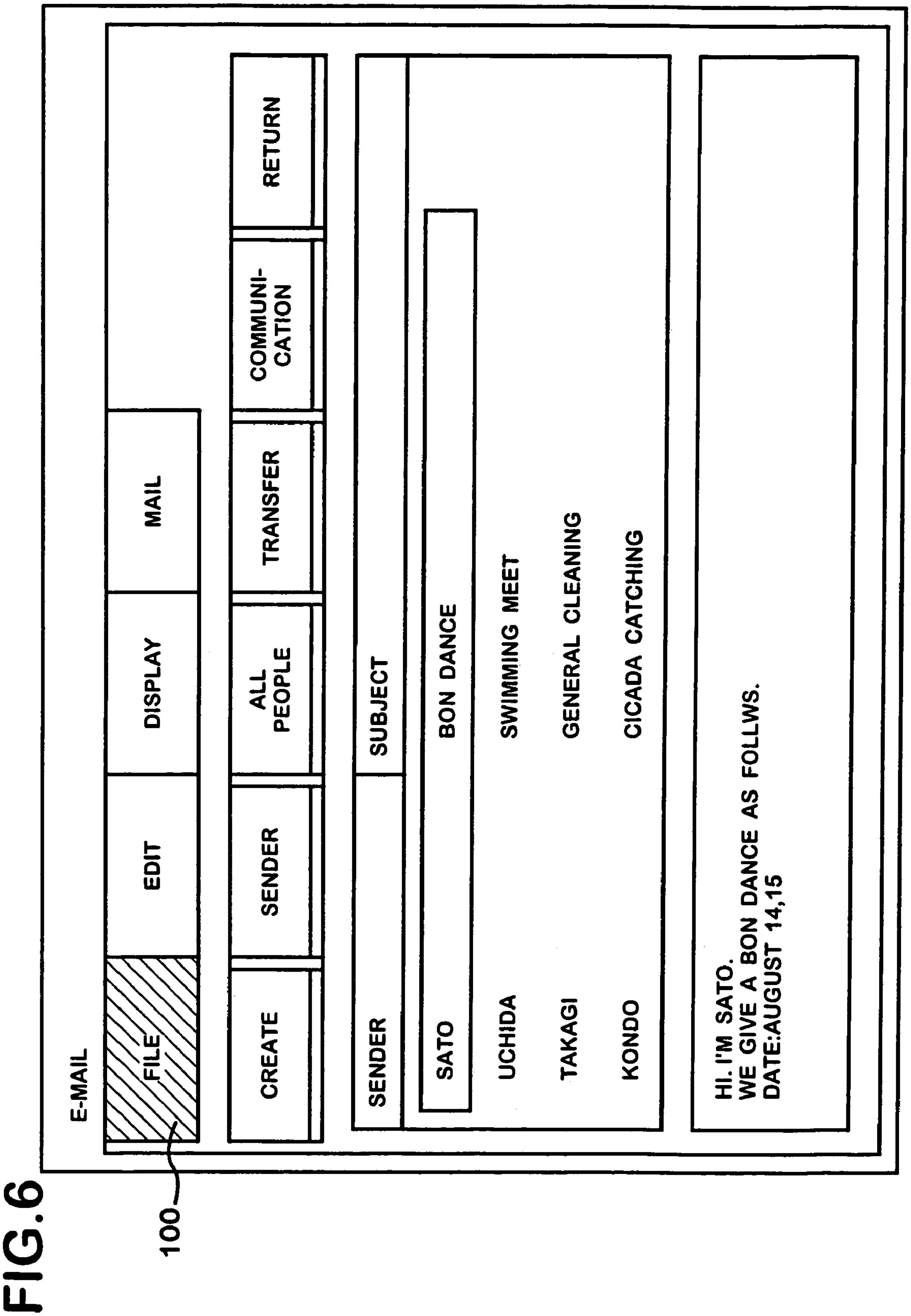
FIG. 6 shows a window for an e-mail application.
Figure 7:
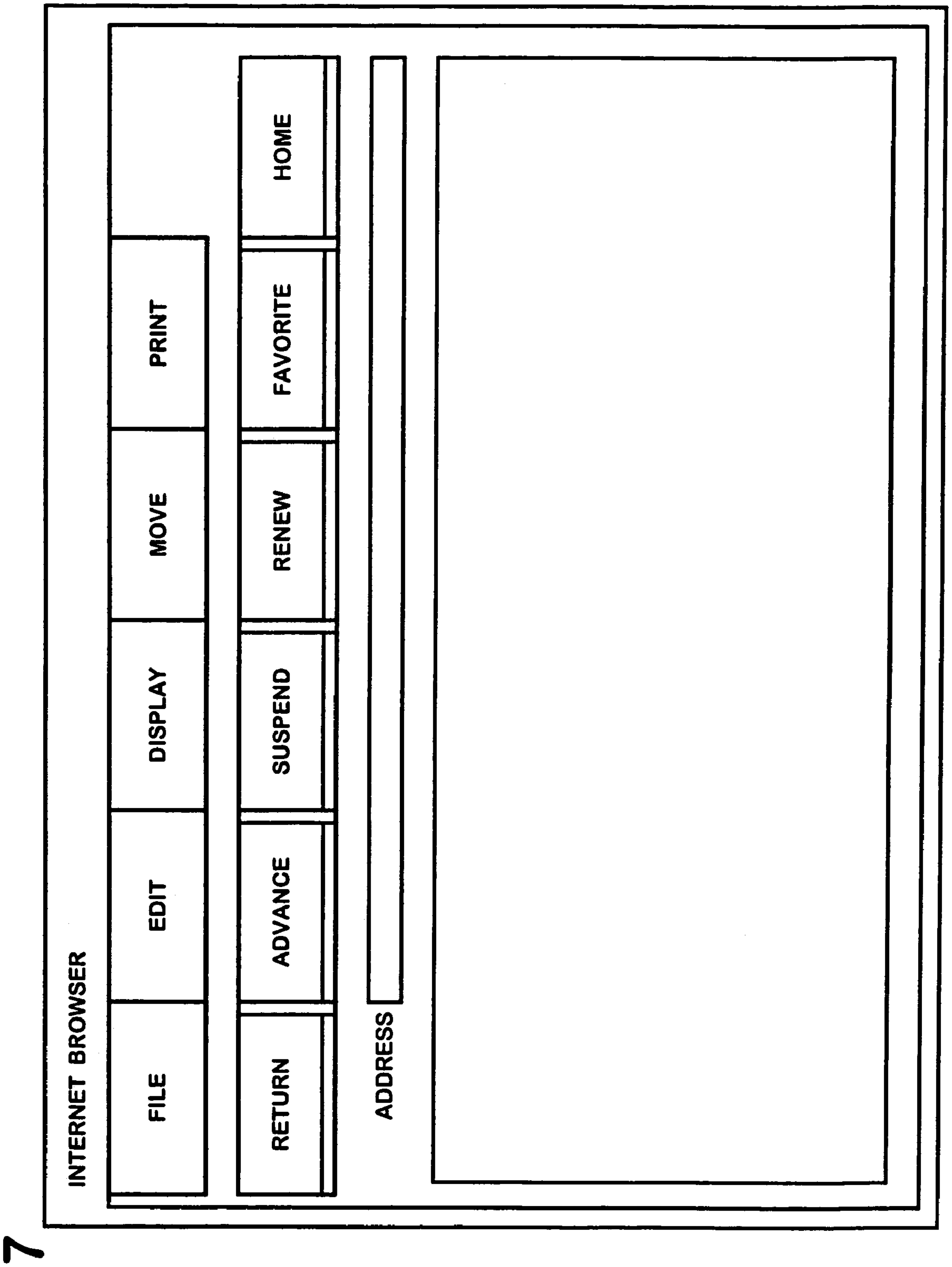
FIG. 7 shows an internet browser application window.

A status assumed here as shown in FIG. 5 is that an e-mail application and an internet application are started up while receiving a broadcast program, and an e-mail window 32 and an internet browser window 34 are displayed as overlapping on a broadcast screen 30. Details of the e-mail window 32 and the internet browser window 34 are shown in FIGS. 6 and 7, respectively.

Figure 3:
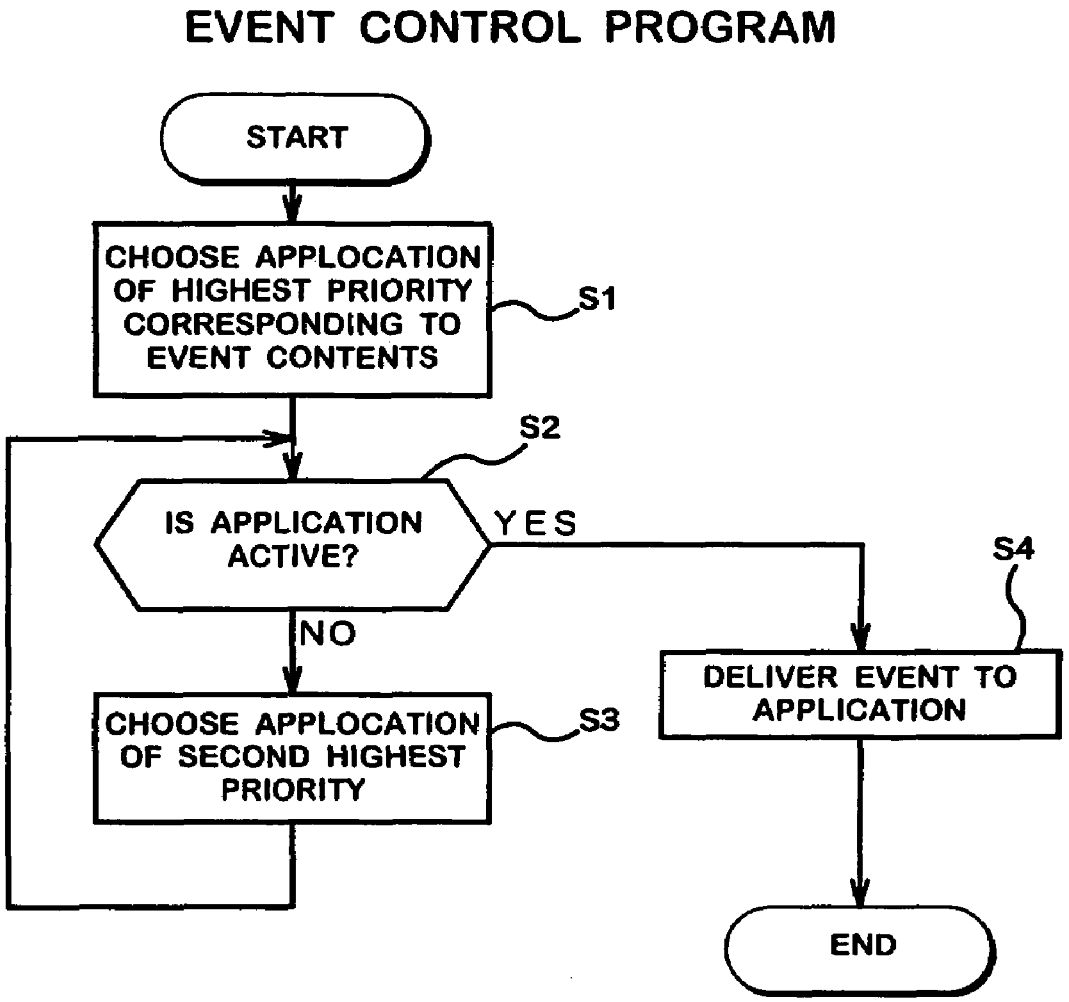
FIG. 3 is a flowchart of an event control program.

When an event is entered through the operation input section 4, an event control process shown in FIG. 3 is started. First, the CPU 24 refers to the delivery priority degree information in the memory 26 and chooses an application of the highest priority degree for the event entered (step S1). For example, in the case a right movement button 36 (FIG. 8) is pressed as an event, priority degrees for respective applications are acquired from the box of right movement button of the delivery priority determining information of FIG. 4. Therefore, the internet browser application acquires the priority order "2," the e-mail application acquires "1," and the tune-in application acquires "." Since the highest of these priority degrees is "1" for the e-mail application, the e-mail application is chosen. Incidentally in this embodiment, it is assumed that the smaller the numeral, the higher the priority degree. The symbol means that no priority degree is given, namely the application is not chosen as the delivery destination of the event.

When the e-mail application is chosen as described above, the CPU 24 determines if the e-mail application chosen is running (step S2). If not, an application of the next priority degree (an internet browser) is chosen (step S3). Here, since the e-mail application is running, the process goes to the step S4. In the step S4, the event of pressing the right movement button is delivered to the e-mail application.

Upon receiving the event of pressing the right movement button, the e-mail application performs a process corresponding to the event. For example as shown in FIG. 6, a marking cursor 100 at "File" is moved right to "Edit." As a result, the status of a menu item "File" being chosen changes to the status of "Edit" being chosen.

As described above, even if the operator does not specify an application as a delivery destination, the event of pressing the right movement button is automatically delivered to the e-mail application. Also for other events, they are delivered to appropriate applications.

In the above embodiment, the case is explained in which the right movement button 36 is pressed in the status of the internet application, e-mail application, and tune-in application are running. Next will be described the case in which the right movement button 36 is pressed in the status of only the internet application and the tune-in application are running.

First, the CPU 24 refers to the delivery priority information (FIG. 4) in the memory 26 and chooses an application of the highest priority degree for the event of pressing the right movement button entered (step S1). Thus, the e-mail application of priority degree "1" is chosen. Next, whether the e-mail application is running is determined (step S2). Here, since the e-mail application is not running, an application of the next highest priority degree is chosen from the delivery priority information (step S3). Thus, the internet browser application of priority degree "2" is chosen. Since the internet browser application is running, the process goes from the step S2 to the step S4 to deliver the event of pressing the right movement button entered to the internet browser application.

As described above, even if the same event is given, the appropriate delivery destination application determined depends on which application is running.

Incidentally in the delivery priority degree information of FIG. 4, the events such as "Menu," "Power," etc. for which no delivery destination applications are described are to be delivered to the system program.

2. SECOND EMBODIMENT

Figure 9:
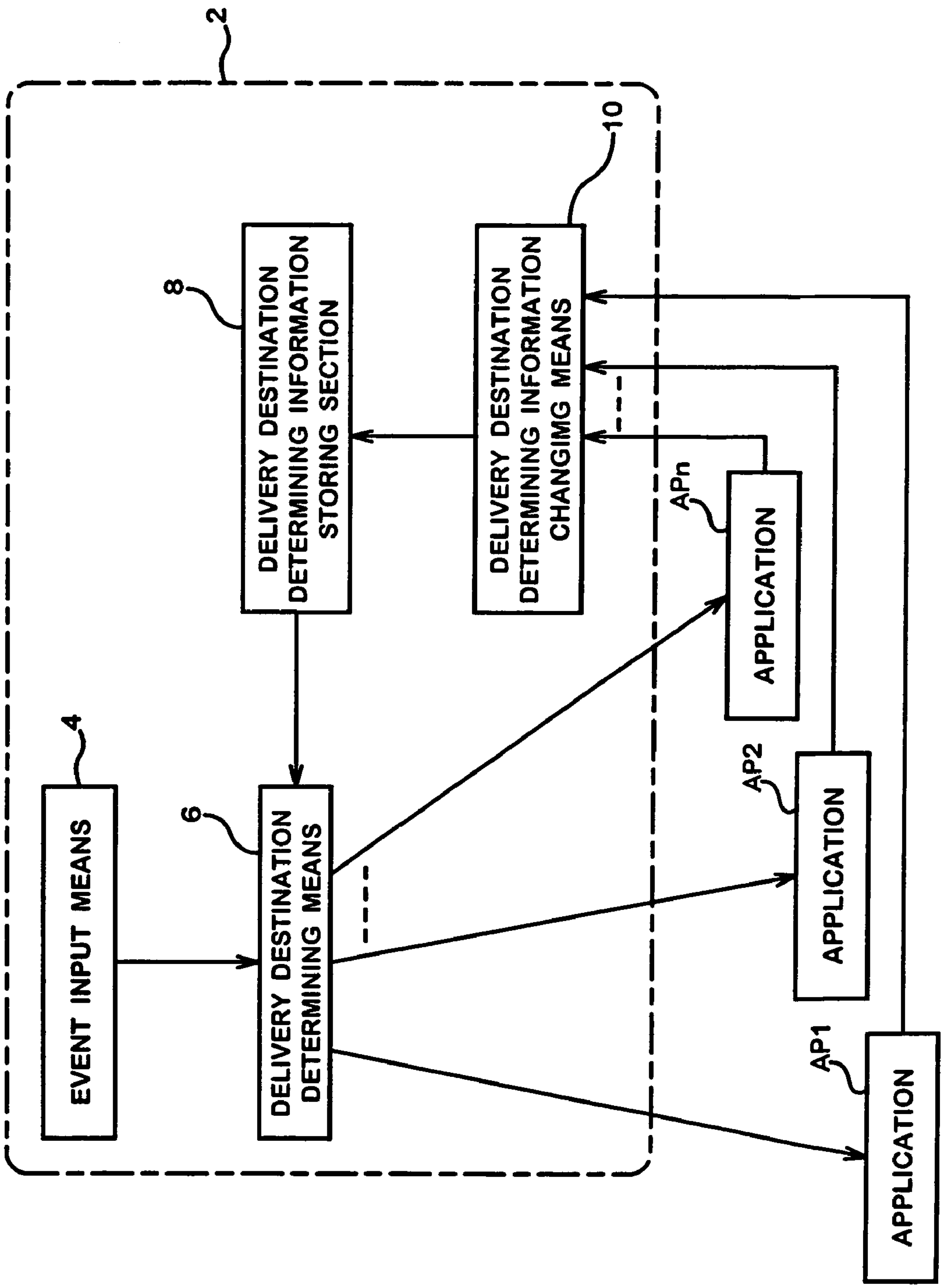
FIG. 9 shows an overall configuration of an event control device as a second embodiment of the invention.

FIG. 9 shows an overall configuration of an event control device 2 as a second embodiment of the invention. This embodiment comprises a delivery destination determining information changing means 10 to acquire the status information on respective applications and to change according to the status the delivery destination determining information recorded in the delivery destination determining information storing section 8.

The hardware structure in which the event control device of FIG. 9 is applied to the digital broadcast receiver 12 is similar to that of FIG. 2. In this embodiment, the event reception specifying information as shown in FIGS. 10 and 11 is recorded as the delivery destination determining information in the memory 26. FIG. 10 shows the event reception specifying information for use when the internet browser application, e-mail application, and tune-in application are running. It shows that events are delivered to the applications provided with a circle ( ). FIG. 11 shows the event reception specifying information for use when the internet browser application and the tune-in application are running. Furthermore, although the event reception specifying information for use when the e-mail application and tune-in application are running is also recorded, illustration here is omitted. In this embodiment as described above, tables of the event reception specifying information are recorded for respective combinations of currently running applications.

Figure 12:
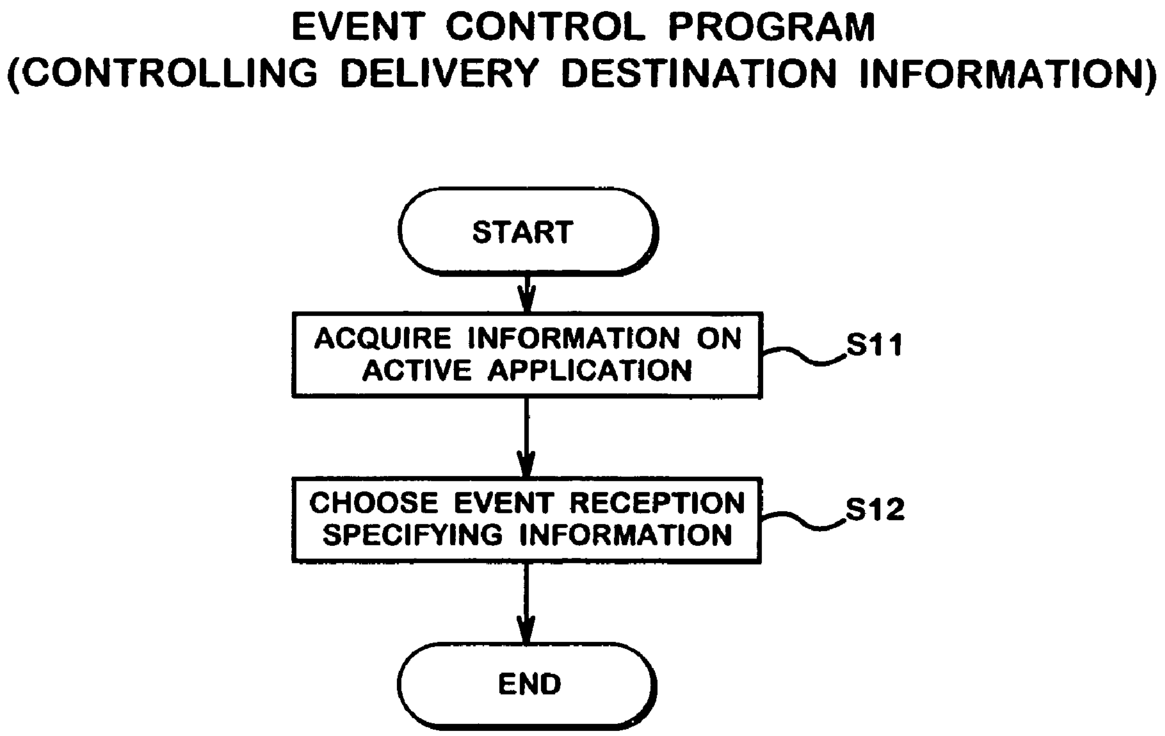
FIG. 12 is a flowchart of an event control program (for controlling delivery destination determining information).
Figure 13:
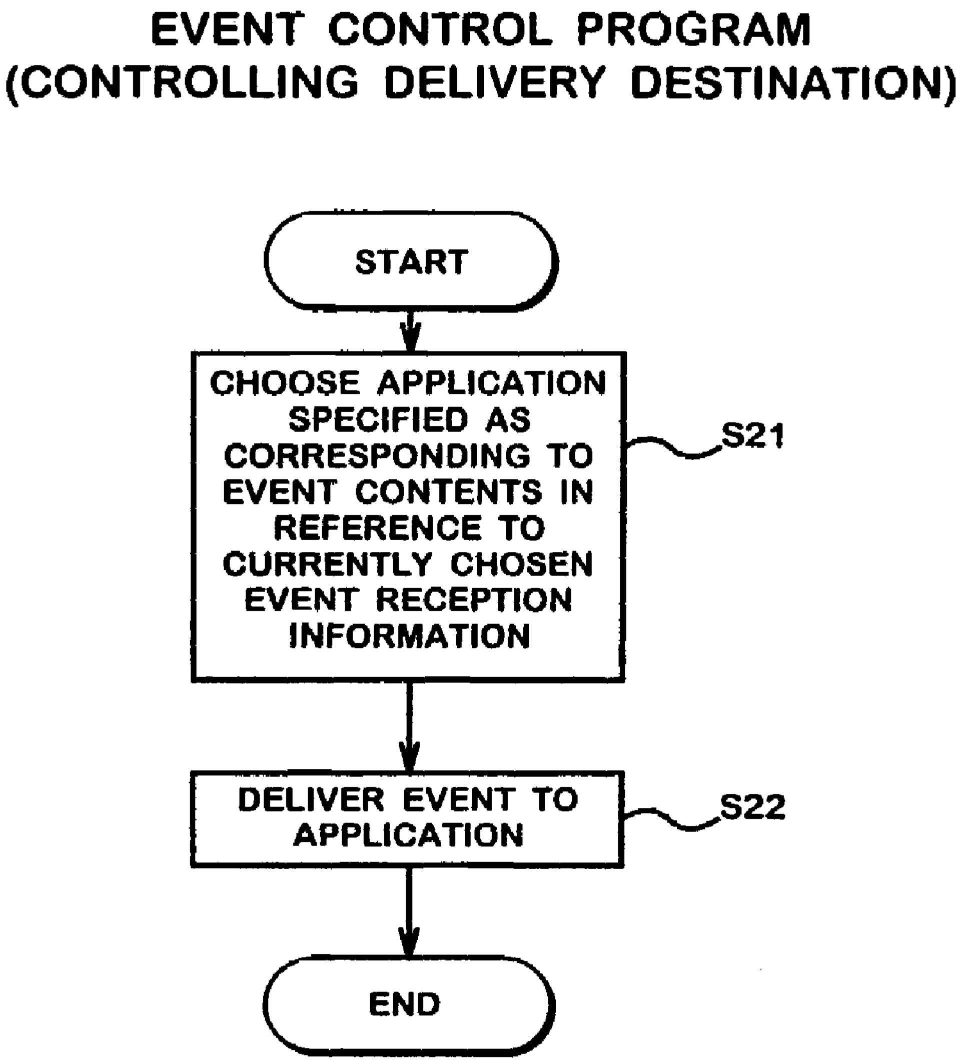
FIG. 13 is a flowchart of an event control program (for determining delivery destination).

FIGS. 12 and 13 show flowcharts of event control programs recorded in the memory 26. FIG. 12 shows a program for controlling the delivery destination information, to be executed when a new application is started or an application is finished. First in the step S11, the CPU 24 acquires information on which applications are running. Next, event reception specifying information is chosen according to the combination of running applications (step S12). For example, when the internet browser application and the tune-in application are running, the event reception specifying information of FIG. 11 is chosen. The event reception information chosen in this way is used in the delivery destination determining program. When there is any change in the running status of applications, the event reception information chosen by the delivery destination determining information control program is changed. As a result, the event reception information used with the delivery destination determining program is also changed.

FIG. 13 shows the delivery destination determining program to be executed when an event is produced. For example, when an event of pressing the "#" button is produced, the tune-in application is determined as the delivery destination according to the event reception information of FIG. 11 being chosen (step S21). Next, the event of pressing the "#" button is delivered to the tune-in application determined as described above. The tune-in application, upon receiving the event, carries out a process corresponding to pressing the "#" button (for example channel tuning using a code number).

This embodiment is adapted to switch the event reception specifying information according to the combination of running applications. Therefore, an appropriate delivery destination application can be chosen according to the combination of running applications. In other words, the delivery destination can be set precisely according to the situation.

While this embodiment is adapted to switch the event reception specifying information according to the combination of running applications, it may be adapted otherwise as described later to change the event reception specifying information according to the running statuses of respective applications. For example, in FIG. 11, in the status of the internet browser application pulling down and showing a specific menu (such as "File," etc. in FIG. 7), a change is made so that the event of pressing numeral keys "1," "2," . . . , "0" is received with the internet browser application. In this way, the delivery destination application can be changed more appropriately and dynamically according to the process statuses of respective applications.

In the above-described case, it is appropriate to adapt that the delivery destination determining information control program acquires information on the running statuses of respective applications and changes the event reception specifying information. It is also appropriate to adapt that the event reception specifying information is changed from the side of respective applications.

3. THIRD EMBODIMENT

Figure 14:
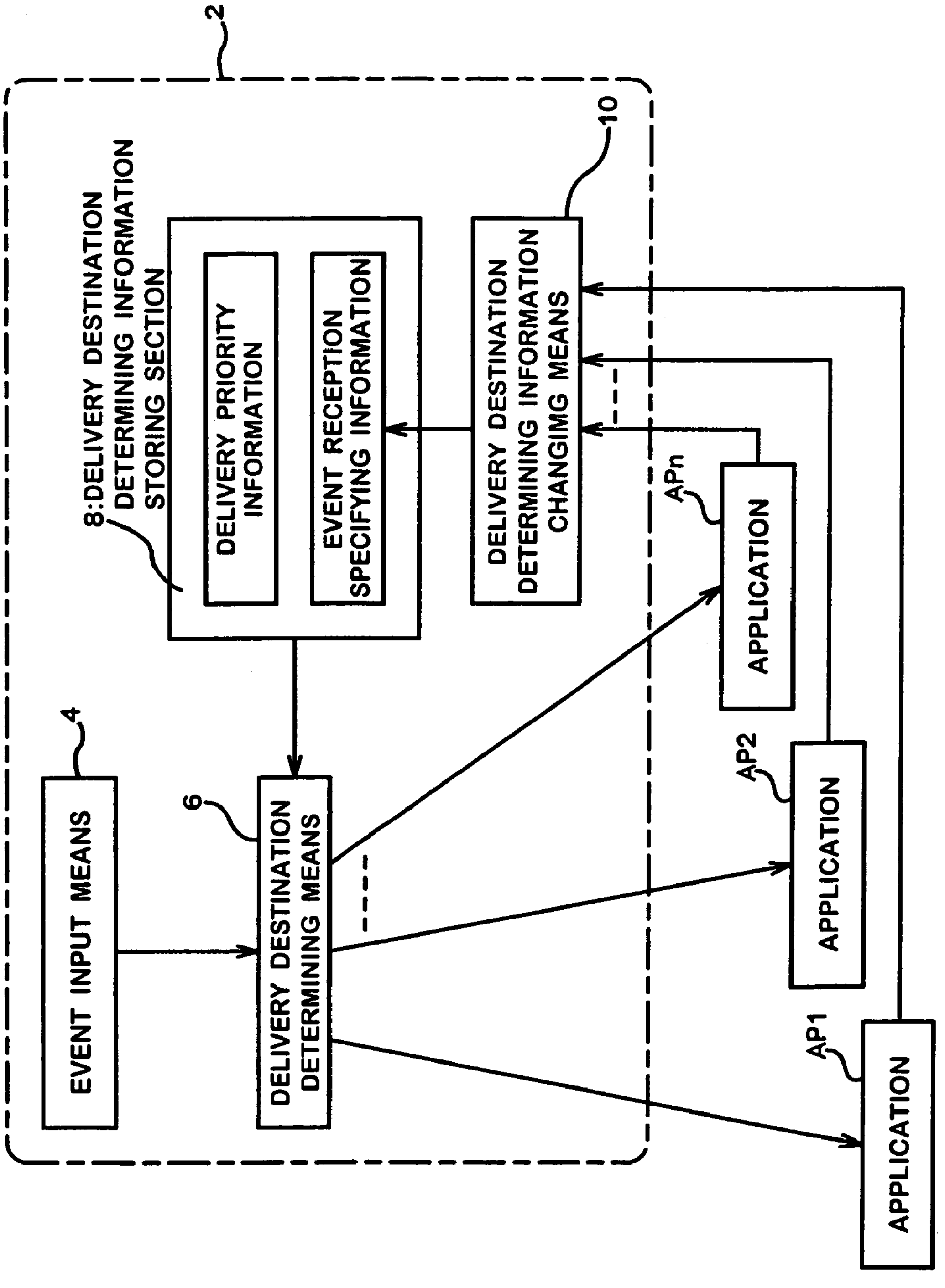
FIG. 14 shows an overall configuration of an event control device as a third embodiment of the invention.

FIG. 14 shows an overall configuration of an event control device 2 as a third embodiment of the invention. In this embodiment, the delivery priority degree information and the event reception specifying information are recorded as the delivery destination determining information in the delivery destination determining information storing section 8. The delivery destination determining information changing means 10 acquires information on the statuses of respective applications and changes the event reception specifying information recorded in the delivery destination determining information storing section 8.

The hardware structure in which the event control device of FIG. 14 is applied to the digital broadcast receiver is similar to that of FIG. 2. In this embodiment, the delivery priority information shown in FIG. 15 and event reception specifying information shown in FIGS. 16, 17 are recorded in the memory 26. Here, the event reception specifying information is provided for each combination of currently running applications. FIG. 16 shows the event reception specifying information when the internet browser application, the e-mail application, and the tune-in application are running. FIG. 17 shows the event reception specifying information when the internet browser application and the tune-in application are running. Furthermore, although not shown, the event reception specifying information for use when the e-mail application and tune-in application are running is also recorded.

Figure 18:
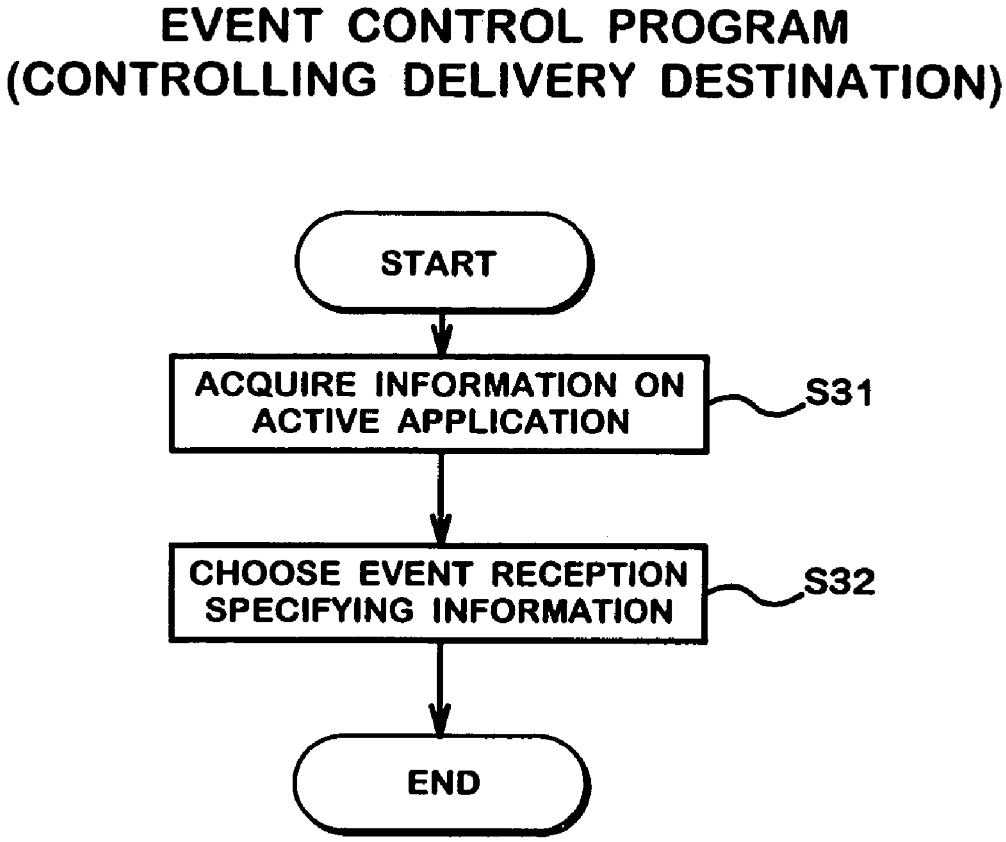
FIG. 18 is a flowchart of an event control program (for controlling delivery destination determining information).
Figure 19:
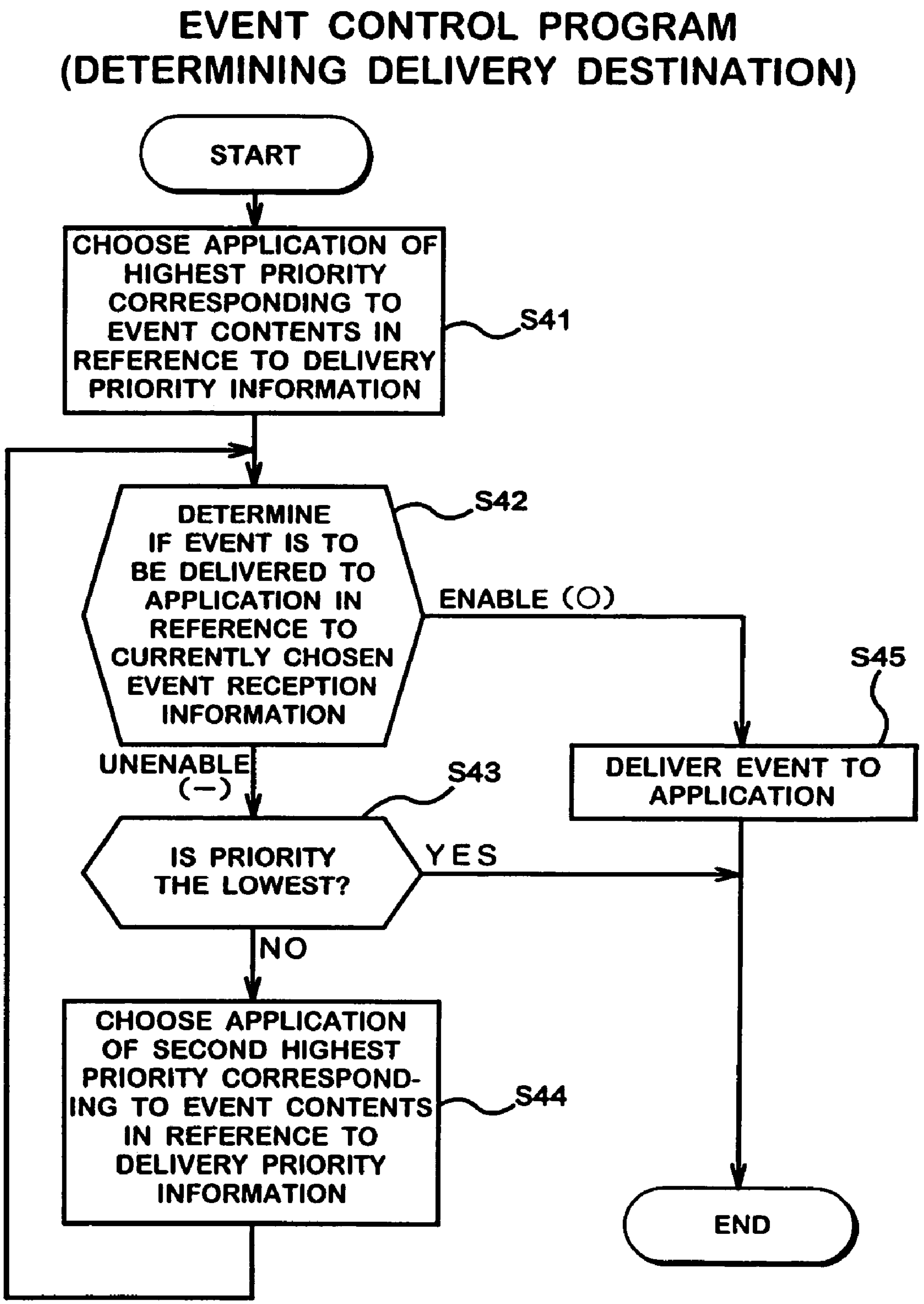
FIG. 19 is a flowchart of an event control program (for determining delivery destination).

FIGS. 18 and 19 show flowcharts of event control programs recorded in the memory 26. FIG. 18 shows a program for controlling the delivery destination determining information, to be executed when a new application is started or an application is finished. First in the step S31, the CPU 24 acquires information on which applications are running. Next, event reception specifying information is chosen according to the combination of running applications (step S32). For example, when the internet browser application, the e-mail application and the tune-in application are running, the event reception specifying information shown FIG. 16 is chosen. The event reception information chosen in this way is used in the delivery destination determining program. When any change occurs in the running status of applications, the event reception information chosen by the delivery destination determining information control program is changed. As a result, the event reception information used with the delivery destination determining program is also changed.

FIG. 19 shows the delivery destination determining program to be executed when an event is produced. It is assumed for example that the operator presses the # button and an event of pressing the # button is produced. The CPU 24 refers to the delivery priority information shown in FIG. 15 and chooses an application of the highest priority degree for the # button pressing event (step S41). Here, the e-mail application of the priority degree "1" is chosen. Next, the event reception specifying information currently chosen as shown in FIG. 16 is referred to and determination is made whether the event may be delivered to the application (step S42). Since it is described in FIG. 16 that the # button pressing event may be delivered to the e-mail application (a circle mark is provided), it is determined that delivery is possible, and the process goes to the step S45.

In the step S45, the # button pressing event is delivered to the e-mail application. The e-mail application responds to the # button pressing event and carries out a process accordingly (for example sending and receiving mails).

When an event of pressing the numeral button "1" is produced, FIG. 15 is referred to and the internet browser application is chosen (step S41). However, from the event reception specifying information shown in FIG. 16, it is seen that the numeral button "1" cannot be delivered to the internet browser application (the mark is written). Therefore, the process goes from the step S42 to the steps S43 and S44.

In the step S44, an application of the next highest priority degree is chosen. Thus, the tune-in application of the priority degree "2" is chosen. According to FIG. 16, since the numeral button "1" may be delivered to the tune-in application, the process goes to the step S45 to deliver the event of pressing the numeral button "1" to the tune-in application.

In this way, the event of pressing the numeral button "1" is delivered to the tune-in application, and the tune-in application carries out tune-in operation accordingly.

Incidentally, in the case an application to which an event may be delivered is not found even if it is tried to find such an application by lowering the priority degree to the lowest, the event is delivered nowhere (or delivered to the system program) and the process is finished. Incidentally, the lowest priority degree can be recognized when the number of applications running is known.

According to this embodiment, since the delivery destination determining information is constituted with the delivery priority degree information and the event reception specifying information, an appropriate delivery destination application may be flexibly set according to situations depending on the combination of the both types of the constituting information.

And, since the event reception specifying information is switched for use according to the combination of running applications, the delivery destinations for events may be appropriately determined according to the running statuses of applications. In particular, the delivery destination is easily set because it is arranged that the delivery priority information is made stationary and to be changed by the change in the event reception specifying information to cope with changes in the situation.

While the above embodiment is adapted to choose the event reception specifying information according to which applications are running, it may also be adapted to change the event reception specifying information according to what operating statuses the respective applications are in.

Figure 20:
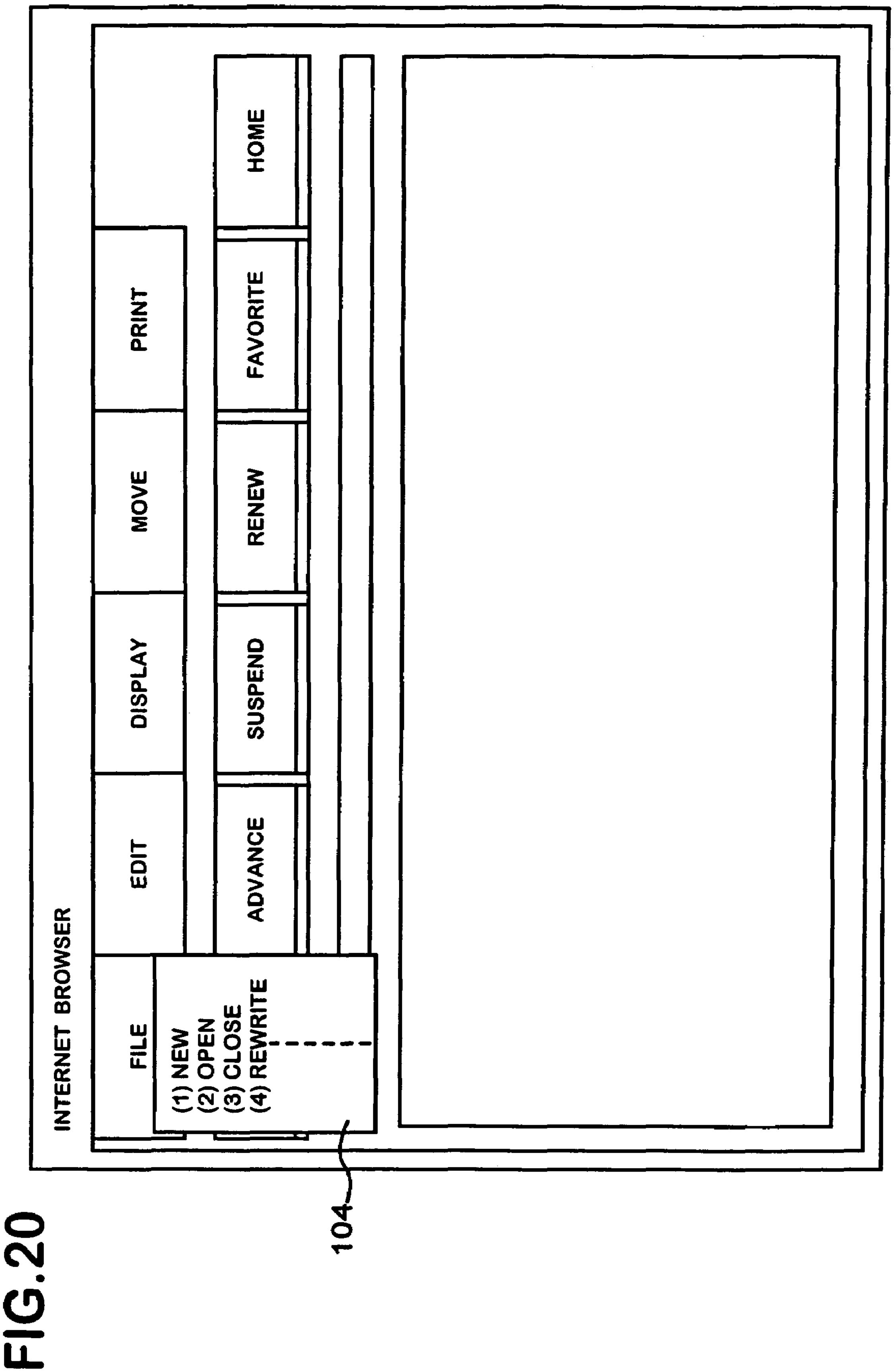
FIG. 20 shows a pull-down menu of an internet browser application window.

For example, it is assumed that the internet browser application and the tune-in application are running and the even reception specifying information shown in FIG. 17 is chosen. In this status, it is assumed that, as a result of an input operation by the operator, the internet browser application is displaying a pull-down menu shown in FIG. 20. The delivery destination determining information control program detects this status and changes the even reception specifying information as shown in FIG. 21. That is, it is made possible that an event of pressing the numeral key is delivered to the internet browser application.

As shown in FIG. 15, with respect to the numeral keys, the internet browser application is set higher in priority degree. Therefore, when the operator presses a numeral key in this status, the event of pressing the numeral key is delivered not to the tune-in application but to the internet browser application. That is to say, the operator can cause the internet browser application to carry out processes according to the numeral key; if the numeral key is "1," to create a new file, if "2," to open an existing file, if "3," to close a file, etc.

When the above process is over, the delivery destination determining information control program brings the event reception specifying information back to the status shown in FIG. 17.

In the way described above, an appropriate application as the destination of delivering an event can be determined according to the current operating statuses of respective applications.

While the above case is arranged that the delivery destination determining information control program acquires information on the running statuses of respective applications and changes the event reception specifying information, it may also be arranged that the event reception specifying information is changed from the side of respective applications.

And, while the above case is arranged that the event reception specifying information is changed according to the pull-down menu being displayed, it may also be arranged that, when an application is present with its pull-down menu displayed, the event is delivered unconditionally to the application with its pull-down menu displayed, without executing the delivery destination determining algorithm shown in FIG. 19.

The above embodiment is arranged that plural pieces of the event reception specifying information are prepared in advance and the pieces of information are switched and used according to which applications are running. Likewise it may be arranged that plural pieces of the delivery priority degree information are prepared in advance and the pieces of information are switched and used according to which applications are running. Furthermore, it may be arranged that the delivery priority degree information is changed according to the operating statuses of respective applications.

In the above embodiment, it is arranged that an event, for which a delivery destination cannot be determined from the delivery priority degree information and from the event reception specifying information, is not delivered to any application. However, it may be arranged that a basic delivery destination application is recorded for each event in advance, and the event is delivered to the basic delivery destination in the case it is impossible to which application the event is to be delivered.

And, while the above embodiment is arranged that the delivery priority degree information is first searched and then it is determined if the event can be delivered, it may also be arranged that applications to be destinations are chosen in advance according to the event reception specifying information, an application having the highest priority degree is chosen from among the applications in reference to the delivery priority degree information, and deliver the event to the application chosen.

It is also possible as shown in FIGS. 22 and 23 to control the delivery priority degree information and the event reception specifying information by groups of events. That is to say, it is arranged that any event, as long as it is pressing a numeral key, is delivered to the same application. In that case, as shown in FIG. 24, event grouping information is recorded in the memory 26 to show how the events are arranged into groups. FIG. 24 shows that the numeral group includes "1," "2," . . . "9," "0," and "#," and the cursor group includes "Move up," "Move right," "Move down," "Move left," and "Decide." By arranging the events into groups in this way, it is possible to simplify the control of the delivery priority degree information and the event reception specifying information.

It may also be arranged that the event grouping information shown in FIG. 24 is changed according to which applications are in operation, the operating status of the applications, etc. so as to make it possible to flexibly set the delivery destination of the event.

While the events are arranged into groups in the above embodiment, the applications may be arranged into groups. In that case, a single event is delivered to a plural number of applications belonging to a single group. It may also be arranged in the similar manner to that describe above to change the contents of groups of applications according to which applications are running, the operating status of the applications, etc. so as to make it possible to flexibly set the delivery destination of the event.

4. FOURTH EMBODIMENT

Figure 25:
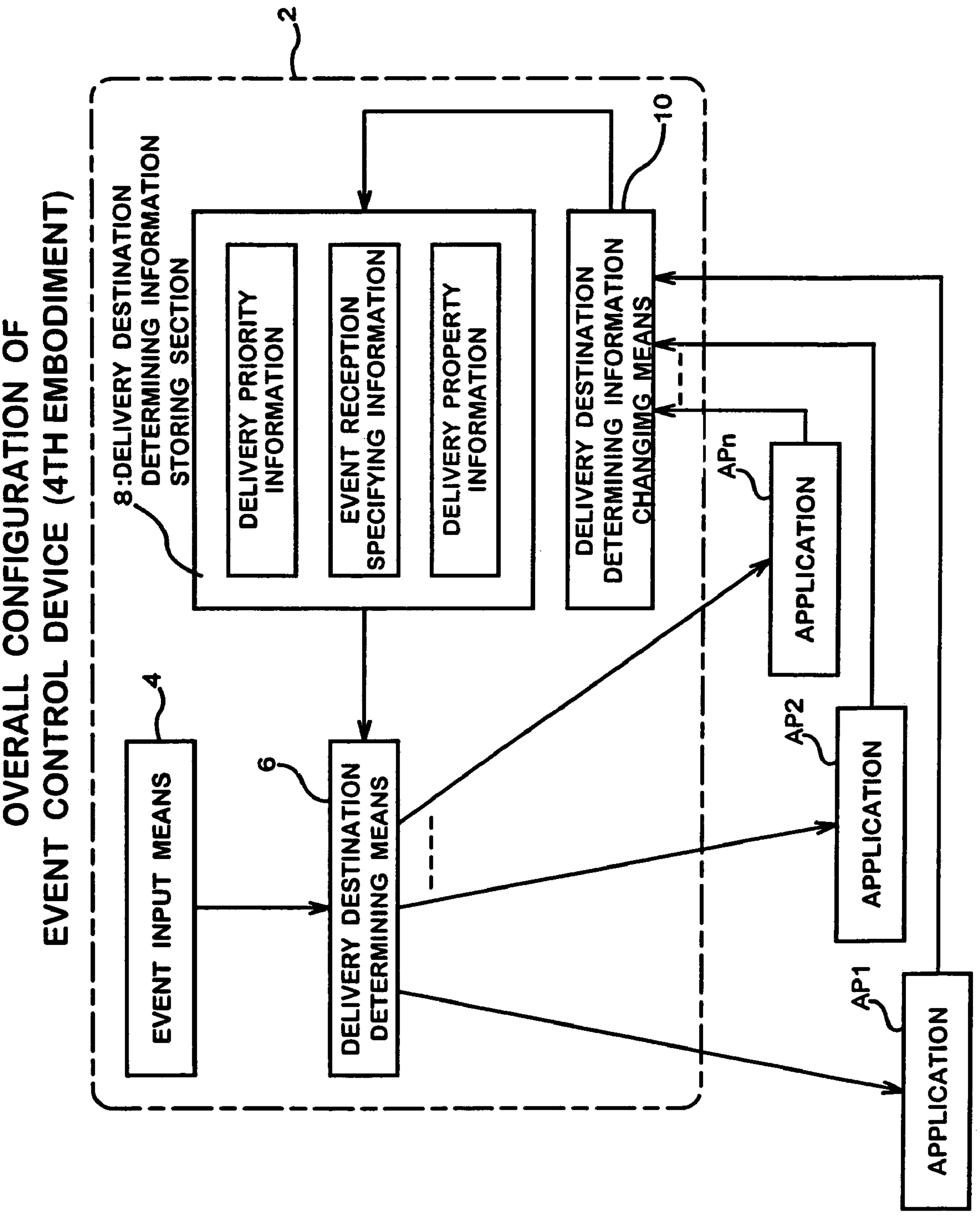
FIG. 25 shows an overall configuration of an event control device as a fourth embodiment of the invention.

FIG. 25 shows an overall configuration of an event control device 2 as a fourth embodiment of the invention. In this embodiment, in addition to the delivery priority degree information and the event reception specifying information, delivery property information is also recorded in the delivery destination determining information storing section 8. The delivery destination determining means 6 determines delivery mode for an event in consideration of the delivery property information. Here, the mode of event delivery refers to how an event is delivered; whether an event is delivered simultaneously to a plural number of applications, to which application an event is first delivered, etc.

The hardware configuration in which the event control device of FIG. 25 is applied to a digital broadcast receiver is similar to that of FIG. 2. In this embodiment, in addition to the delivery priority information shown in FIG. 15 and the event reception specifying information shown in FIGS. 16 and 17, delivery property information as shown in FIG. 26 is recorded in the memory 26. Incidentally, it may be arranged either that the delivery property information is provided for each combination of running applications so as to be chosen and used, or that a fixed type of delivery property information is used.

Figure 27:
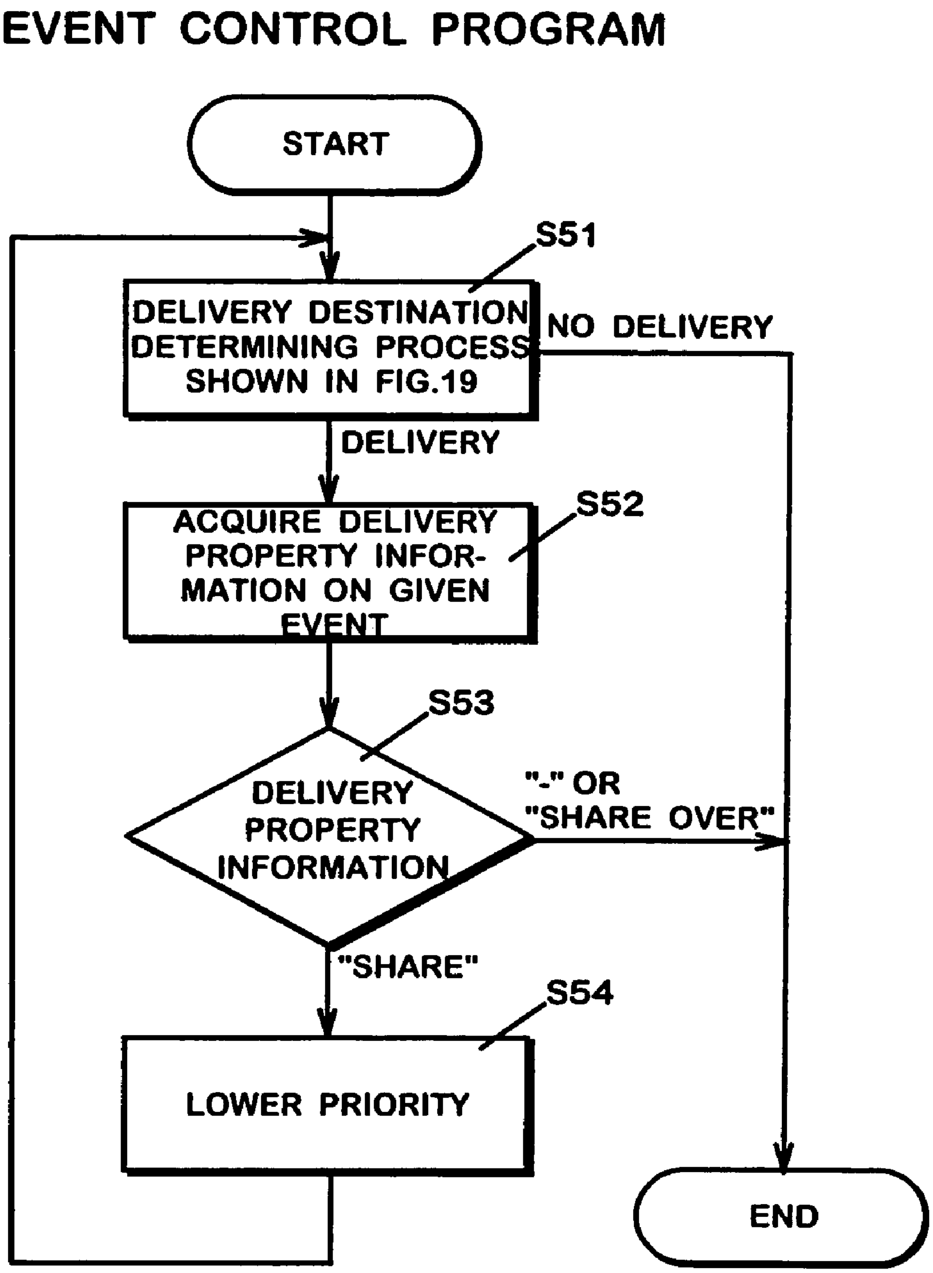
FIG. 27 is a flowchart of an event control program.

FIG. 27 shows a flowchart of an event control program. It is assumed that an event of pressing the "Move down" key occurs in the status of using the delivery priority degree information of FIG. 15, the event reception specifying information of FIG. 16, and the delivery property information of FIG. 26. In this case, first the e-mail application is chosen according to the delivery priority information shown in FIG. 15, and since the delivery is possible according to the event reception specifying information shown in FIG. 16, the event of pressing the "Move down" key is delivered to the e-mail application (step S51).

Next, referring to the delivery property information shown in FIG. 26, it is known that the property of the event of pressing the "Move down" key in the e-mail application is "Share" (step S52). Thus the CPU 24 is notified that the event is simultaneously delivered to other applications.

Next, the CPU 24 lowers the priority degree by one (here, down to "2") and carries out the step S51. Thus, the internet browser application provided with priority degree "2" of the delivery priority degree information shown in FIG. 15 is chosen. Since the internet browser application is a delivery destination according to the event reception specifying information shown in FIG. 16, the "Move down" key is delivered also to the internet browser application.

Next, referring to the delivery property information shown in FIG. 26, it is known that the property of the event of pressing the "Move down" key in the internet browser application is "Share over" (step S52). Thus, the CPU 24 is notified that the event cannot be delivered further to other applications. Therefore, the event delivery process is finished (step S53).

As described above, providing the delivery property information makes it possible to appropriately set the mode of event delivery.

And, it may also be arranged that the delivery property information can be changed according to which applications are running, or to the current operating status of applications.

It is also possible to control the delivery property information in the similar manner to that described before, to control events and applications arranged in groups.

5. FIFTH EMBODIMENT

Figure 28:
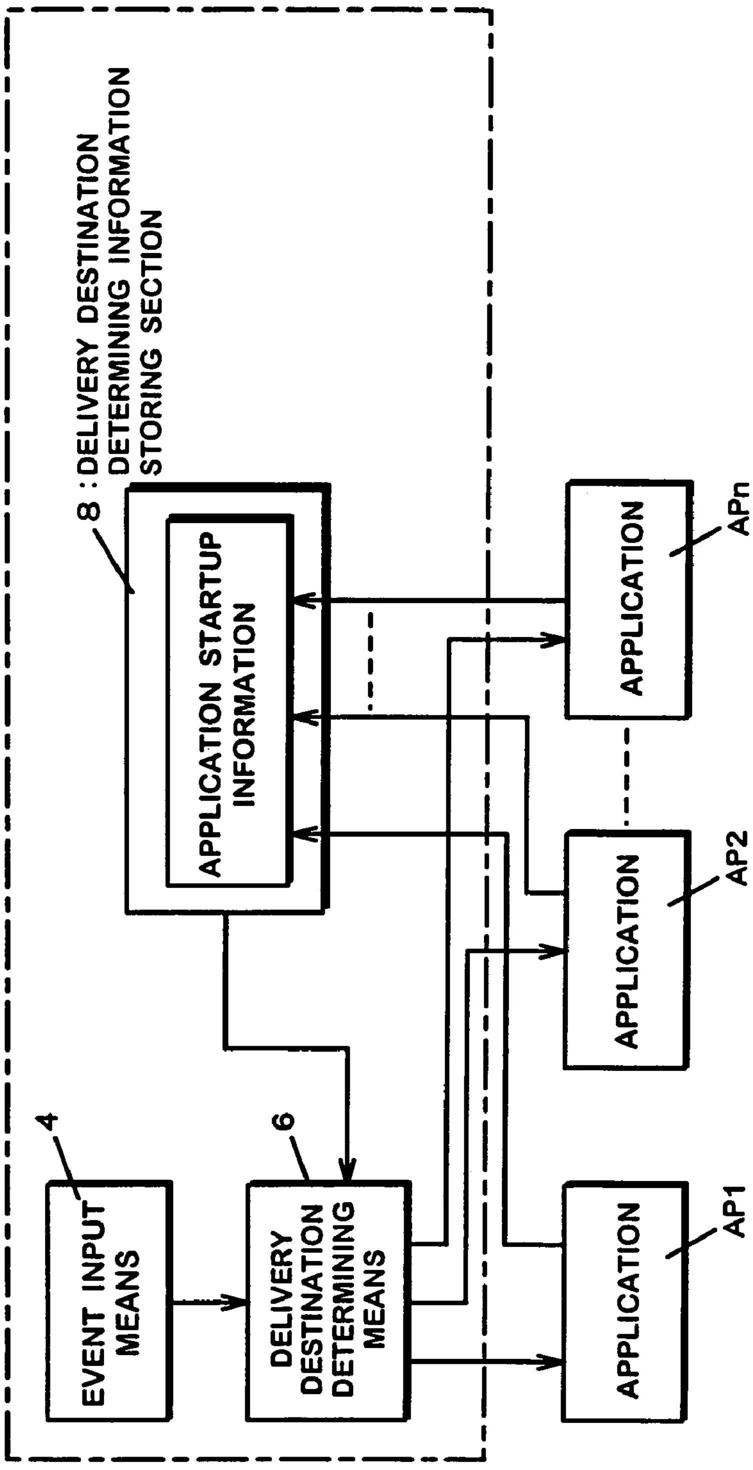
FIG. 28 shows an overall configuration of an event control device as a fifth embodiment of the invention.

The embodiments described above are arranged that the delivery priority information, the event reception specifying information, the delivery property information, etc. are recorded and used as the delivery destination determining information. However, it is also possible to arrange as shown in FIG. 28 that each of the applications AP1, AP2, . . . , APn writes application start-up information, namely information on whether the application itself is running or not as the delivery destination determining information, to the delivery destination determining information storing section 8.

An example of application start information is shown in FIG. 29. The delivery destination determining means 6 refers to the application start information, determines an application to which the event given is to be delivered, and delivers the event accordingly.

6. SIXTH EMBODIMENT

Each of the embodiments described above is arranged that the delivery destination determining means 6 delivers an event selectively to applications AP1, AP2, . . . , APn according to the delivery destination determining information of the delivery destination determining information storing section 8. However, it may also be arranged that an event is delivered to all the applications (currently in operation) and a determination is made in each of the applications AP1, AP2, . . . , APn whether or not the event received is to be executed (whether it is to be handled as an effective event) according to the event executing information.

Figure 30:
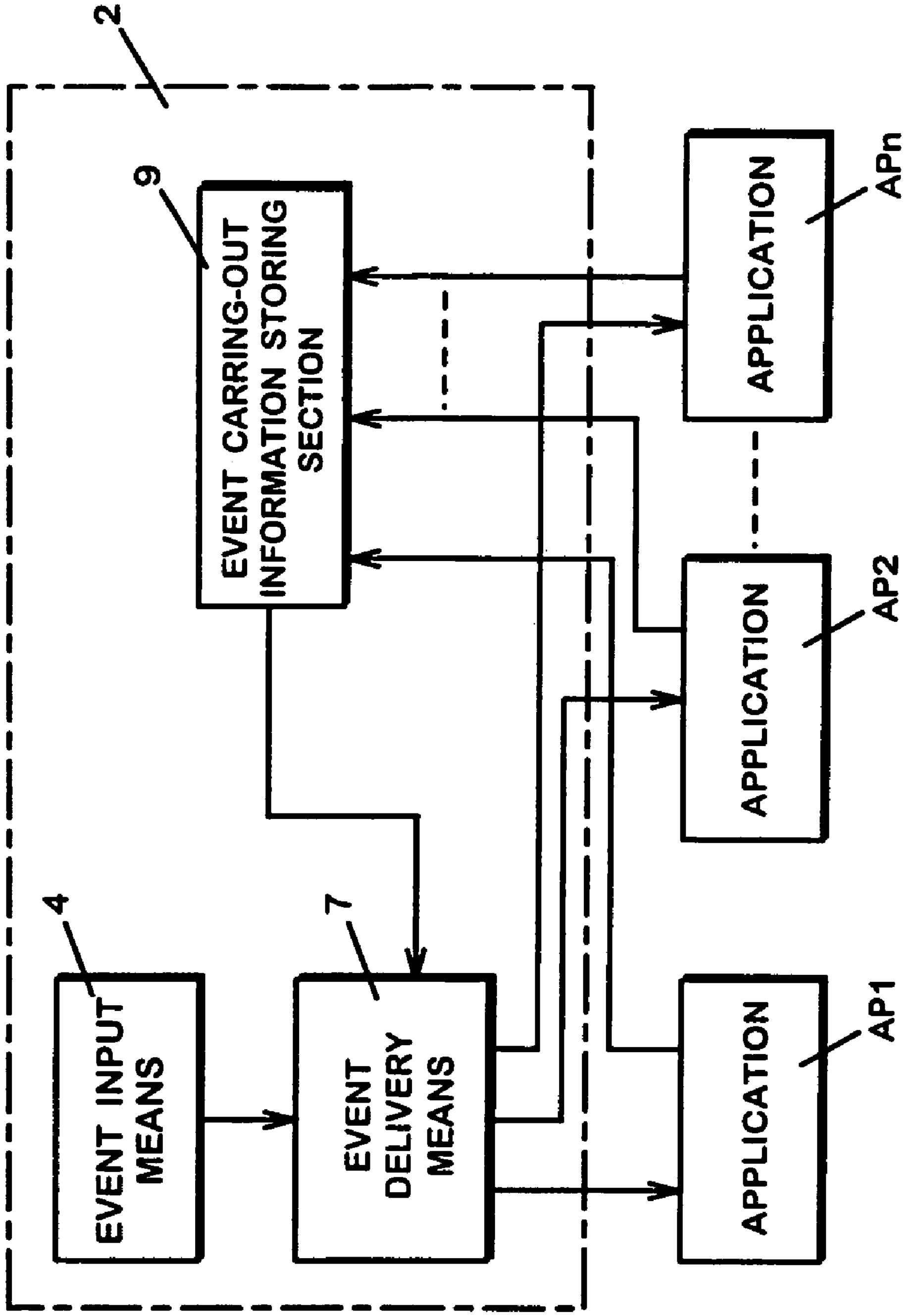
FIG. 30 shows an overall configuration of an event control device as a sixth embodiment of the invention.
Figure 32:
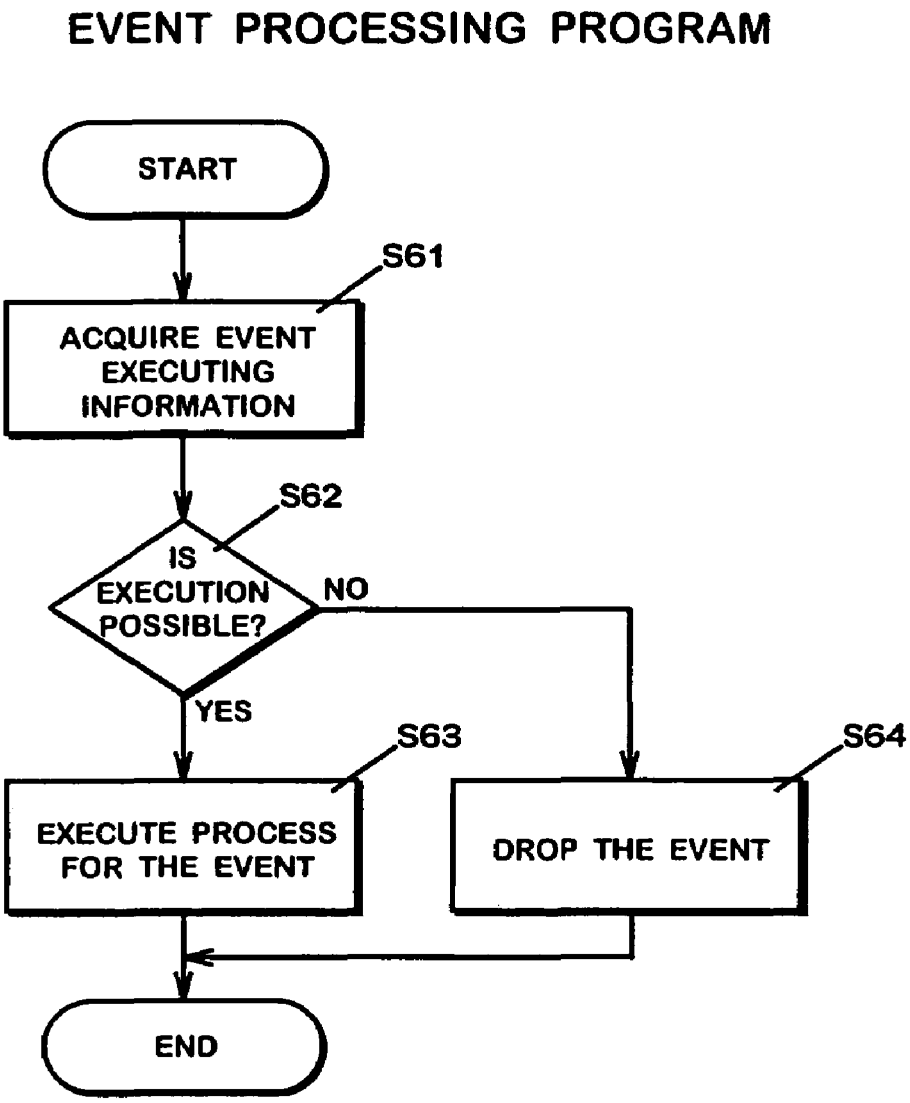
FIG. 32 is a flowchart of an event processing program.

Such an embodiment is shown in FIG. 30. The hardware configuration in which the event control device of FIG. 30 is applied to a digital broadcasting device is similar to that of FIG. 2. In this embodiment, event executing information as shown in FIG. 31 is recorded in the memory 26. An event processing program as shown in FIG. 32 is contained in each of the applications AP1, AP2, . . . , APn.

First, an application, upon receiving an event, determines from the event executing information shown in FIG. 31 whether or not the application itself should execute the received event (step S61). For example, in the case the application is a browser application and the event is pressing the numeral key "9," execution of the event is determined as possible ( ) according to FIG. 31 (step S62). In this case, the browser executes a process for the event (step S63).

And in the case the event given is "#," execution of the event is determined as impossible (x) (step S62). In this case, the browser destroys the event and does not execute the process for that event (step S64).

Other applications which have received the event also determine whether or not the event should be executed. Therefore, in the case the event executing information is set as shown in FIG. 31, and if it is a numeral key, it is executed in both of the browser and the e-mail applications.

It may also be arranged that the event executing information for use is changed depending on which application is in operation or on its operating status.

While the above embodiment is arranged that there may be a case in which an event is executed with a plural number of applications, it may also be arranged depending on the manner of describing the event executing information that an event is executed with only a single application.

Figure 51:
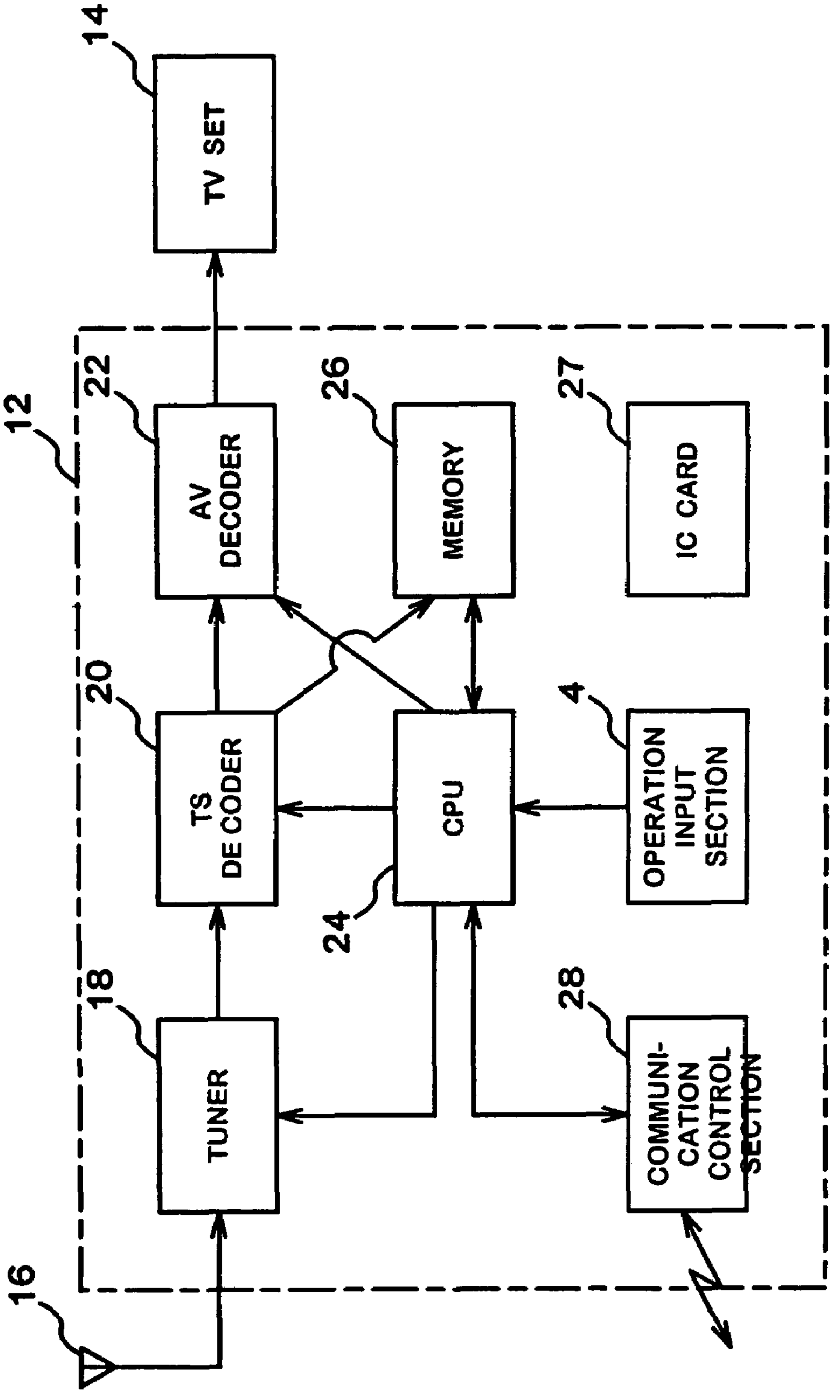
FIG. 51 shows a hardware configuration of a digital receiver.

It may also be arranged for the first to sixth embodiments described above that the delivery destination determining program, the respective applications, and the delivery destination information are recorded in an IC card 27 and used as shown in FIG. 51. This makes it easy to add new applications, to change the delivery destination determining information, etc.

It may also be arranged to rewrite the delivery destination determining program, the respective applications, and the delivery destination information recorded in the memory 26 using the communication control section or broadcast waves instead of the IC card 27.

In any of the above cases, even if the same event is given in the same status (with the same application being started and in the same operating status), when rewriting or replacement is made, the result is that the event is executed in different applications and differently displayed (with different output results) on a TV set.

7. SEVENTH EMBODIMENT

7.1 Overall Constitution of Digital Broadcasting System

Figure 33:
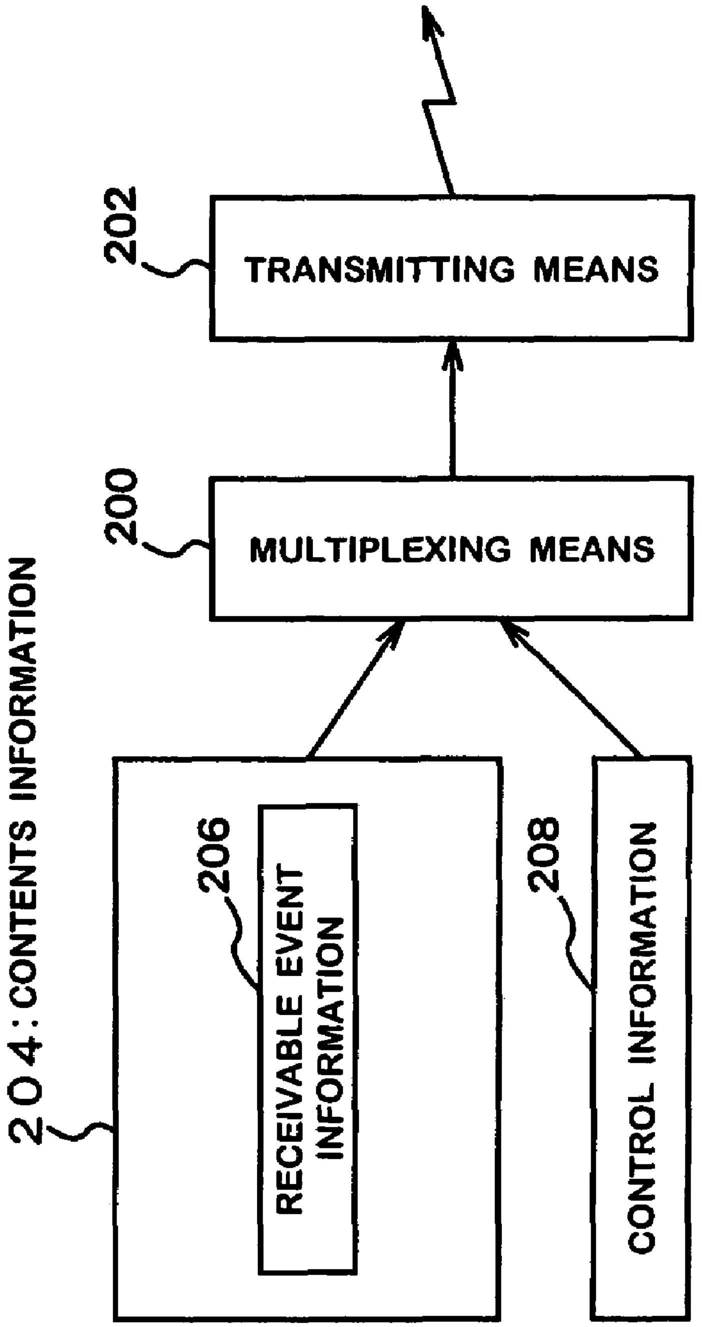
FIG. 33 shows the entire configuration of a transmitter of a seventh embodiment.
Figure 34:
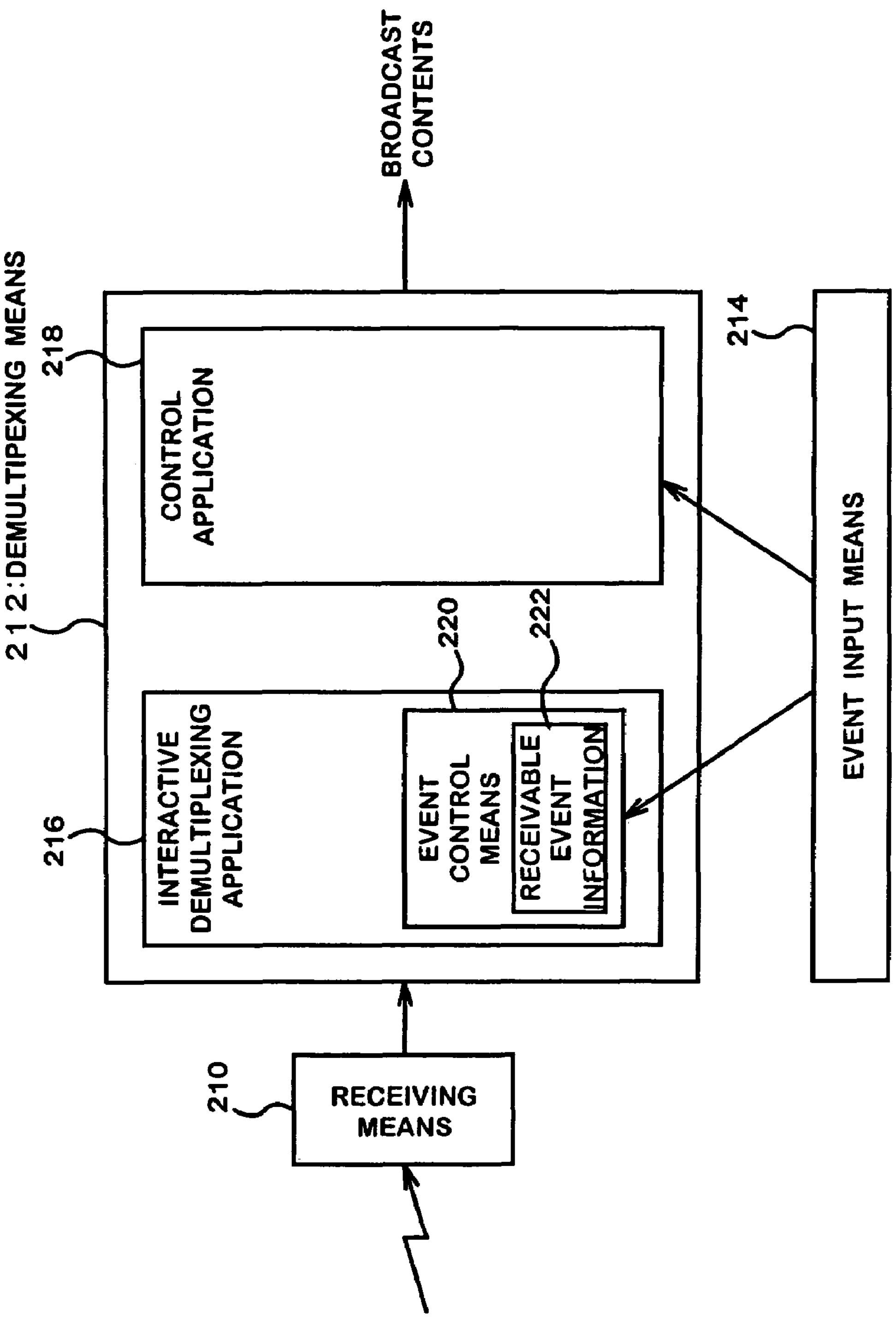
FIG. 34 shows the entire configuration of a receiver of the seventh embodiment.

The general configuration of a digital broadcast system according to the embodiment shown in FIG. 7 is shown in FIGS. 33 and 34. A multiplexing means 200 shown in FIG. 33 arranges broadcast contents information 204 into multiplex packets according to control information 208. The multiplexed data are given as a transport stream to a transmitting means 202 and transmitted through satellite waves or surface waves.

Incidentally, although not shown, a plural number of broadcast contents (service contents) are multiplexed in a single transport stream.

In this embodiment, events that may be received on the receiver side in relation to the contents information 204 are included as receivable event information in the contents information 204. Therefore, the receivable event information is also multiplexed by means of the multiplexing means 200 and delivered.

A receiving means 210 shown in FIG. 34 receives waves transmitted, and outputs them in a transport stream. A demultiplexing means 212 chooses an intended service from the transport stream and demultiplexes the broadcast contents according to the control information, etc. The step of choosing the intended service, etc. is carried out with a control application 218 according to the event from an event input means 214 which receives events entered by an operator.

An interactive demultiplexing application 216, in addition to demultiplexing the contents information, changes the broadcast contents according to the event received from the event input means 214. An event control means 220 controls to determine which of the events given from the event input means 214 is or is not to be delivered to the interactive demultiplexing application. This delivery control is carried out according to the receivable event information 222 delivered as multiplexed in contents information.

As described above, this embodiment makes it possible for a person who provides contents to determine events to be made receivable-on the receiver side and to achieve flexible event reception according to broadcast contents.

7.2 Transmitter

Figure 35:
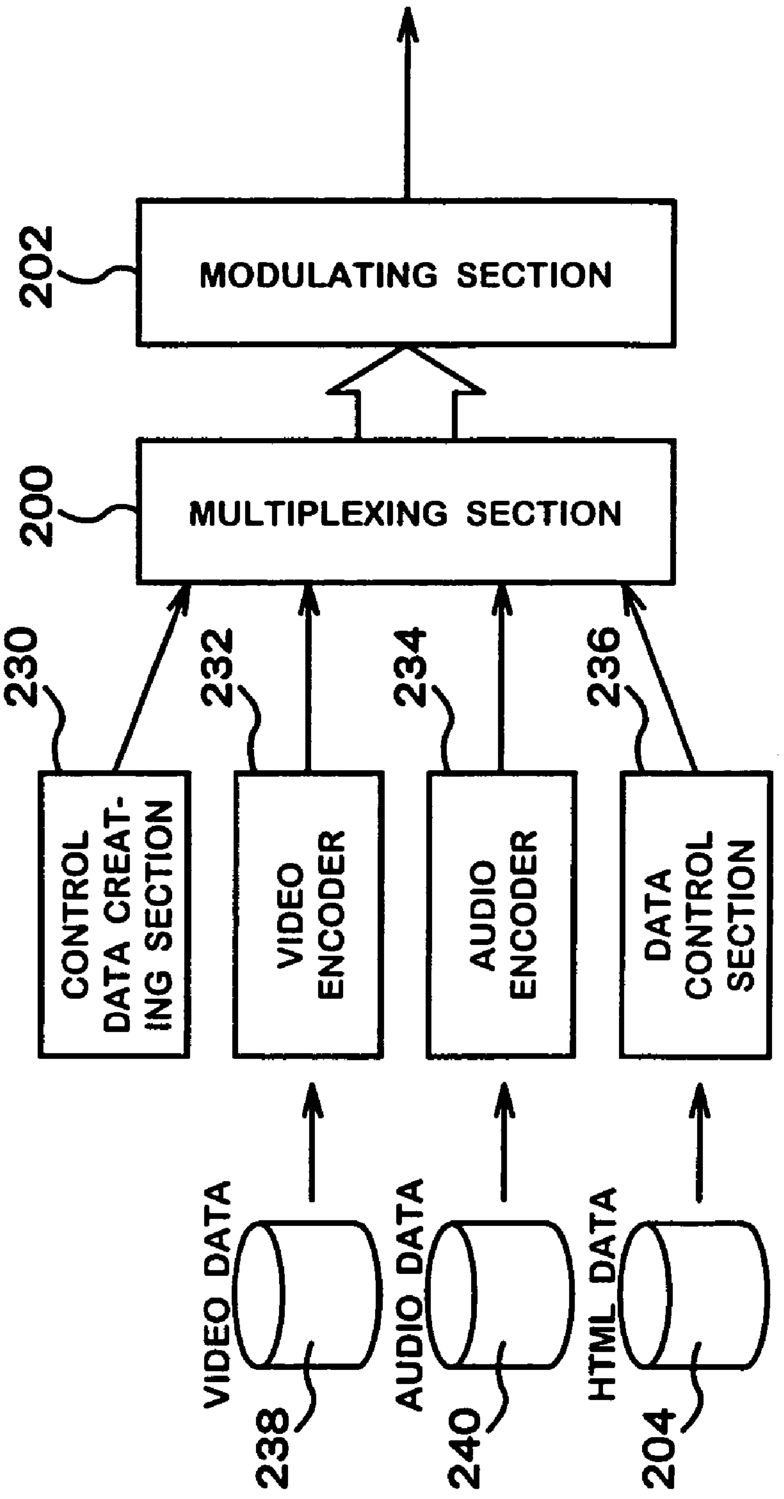
FIG. 35 shows a detailed configuration of a transmitter.

FIG. 35 shows an example of detailed configuration of a transmitter. This embodiment is an example for multiplexing and transmitting services using video and audio data and HTML (hyper text markup language) data.

The video data 238 are compressed with an encoder 232 and given to a multiplexing section 200. Likewise, the audio data 240 are compressed with an encoder 234 and given to the multiplexing section 200.

The HTML data 204 are controlled with a data control section 236 and given to the multiplexing section 200.

In this embodiment, the video and audio data as a single service (SV1) and the HTML data as a single service (SV2) are arranged into packets and multiplexed through the multiplexing section 200. The created transport stream is modulated in the modulating section 202 and transmitted. Incidentally, control data required to discriminate packets in connection with the packeting are created in a control data generating section 230 and multiplexed in the multiplexing section 200.

Although not shown, the transport stream created as described above is modified to have different frequencies, etc. to make a plural number of transport streams which are transmitted.

This embodiment is assumed that receivable event information is described in the HTML data.

Figure 36:
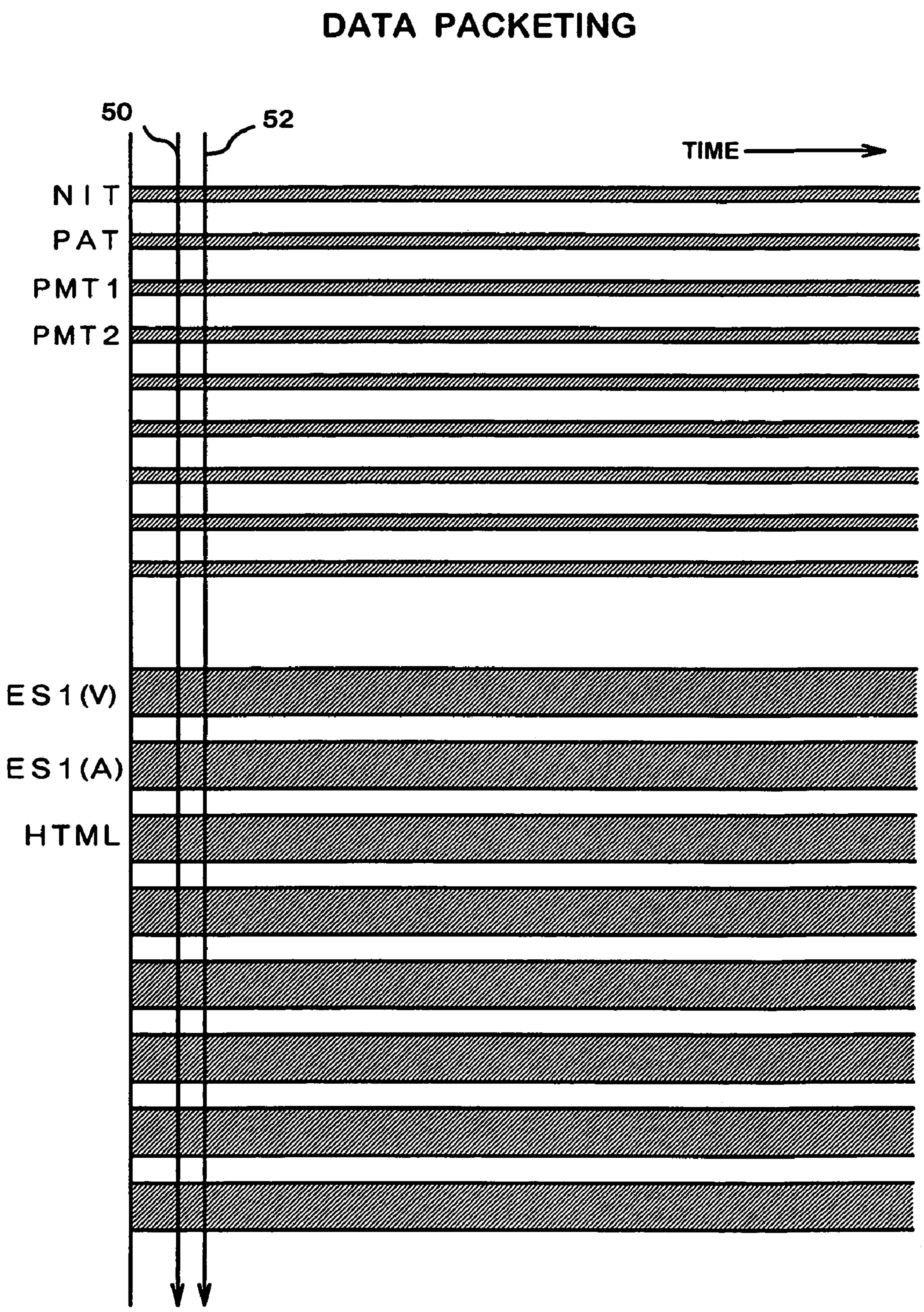
FIG. 36 shows data packeting.
Figure 37:
FIG. 37 shows a packeted data structure.

FIG. 36 shows control data (NIT, PAT, PMT1, PMT2) and contents data (ES1(V), ES1(A), HTML) constituting the transport stream created. The control data and the contents data are respectively arranged in a packet structure as shown in FIG. 37. That is to say, the data are divided into groups of specified lengths and provided with packet IDs for identification.

As shown schematically with a line 50 in FIG. 36, when the packeting of the control data (NIT, PAT, PMT1, PMT2) and contents data (ES1(V), ES1(A) is over, the next packeting is carried out as shown with a line 52.

Figure 38:
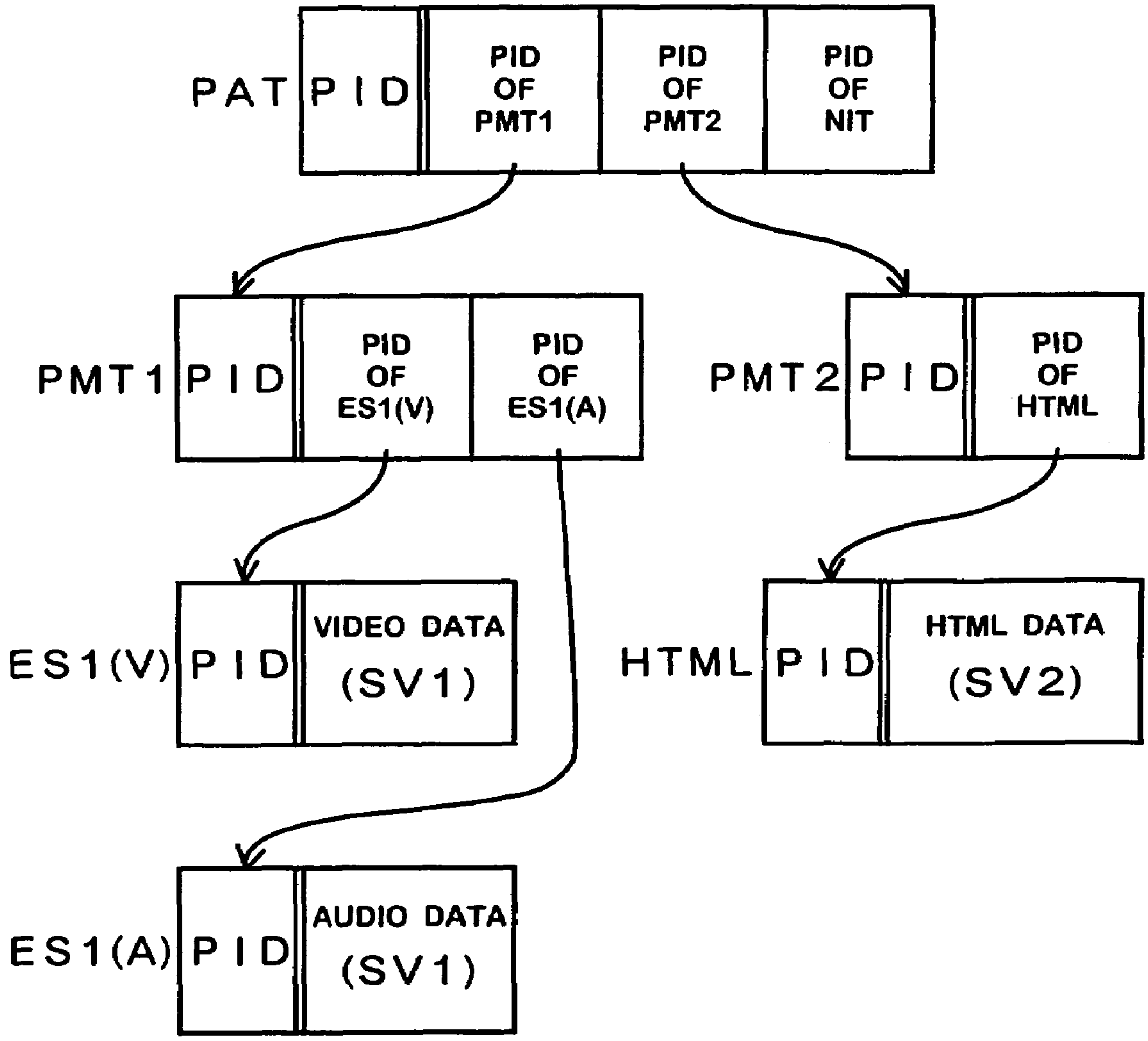
FIG. 38 shows relation between control data and contents data.

As shown in FIG. 38, the packet ID of the video and audio service SV1 is described in the control data PMT1. Further, the packet ID of the control data PMT1 is described in the control data PAT. Likewise, the packet ID of the service SV2 of the HTML data is described in the control data PMT2, and the packet ID of the control data PMT2 is described in the control data PAT. Therefore, it is constituted that data of an intended service may be acquired by acquiring the control data PAT and PMT.

As shown in FIG. 39, an overview table of services included in respective transport streams are described in the control data NIT. The packet ID of the control data NIT is described in the control data PAT.

FIG. 40 shows example data of the HTML data as contents of the service SV2. As described later, this HTML data are interpreted with a browser application on the receiver side and displayed. The HTML data are constituted with a definition information describing portion 510 and a major information describing portion 512.

In this embodiment, the description key list:"number.basic" in the fourth line of the definition information describing portion 510 is the receivable event information, and thus the browser application on the receiver side shows the receivable event.

The term key list: shows that a receivable event follows the colon (:). Here, it is shown that the events 'number' and 'basic' are receivable. The 'number' represents the group of numeral keys, and 'basic' represents the group of cursor movement keys, decision key, etc. Therefore, the browser application on the receiver side can receive events of pressing the numeral keys, cursor movement keys, decision key, etc.

7.3 Receiver

Figure 41:
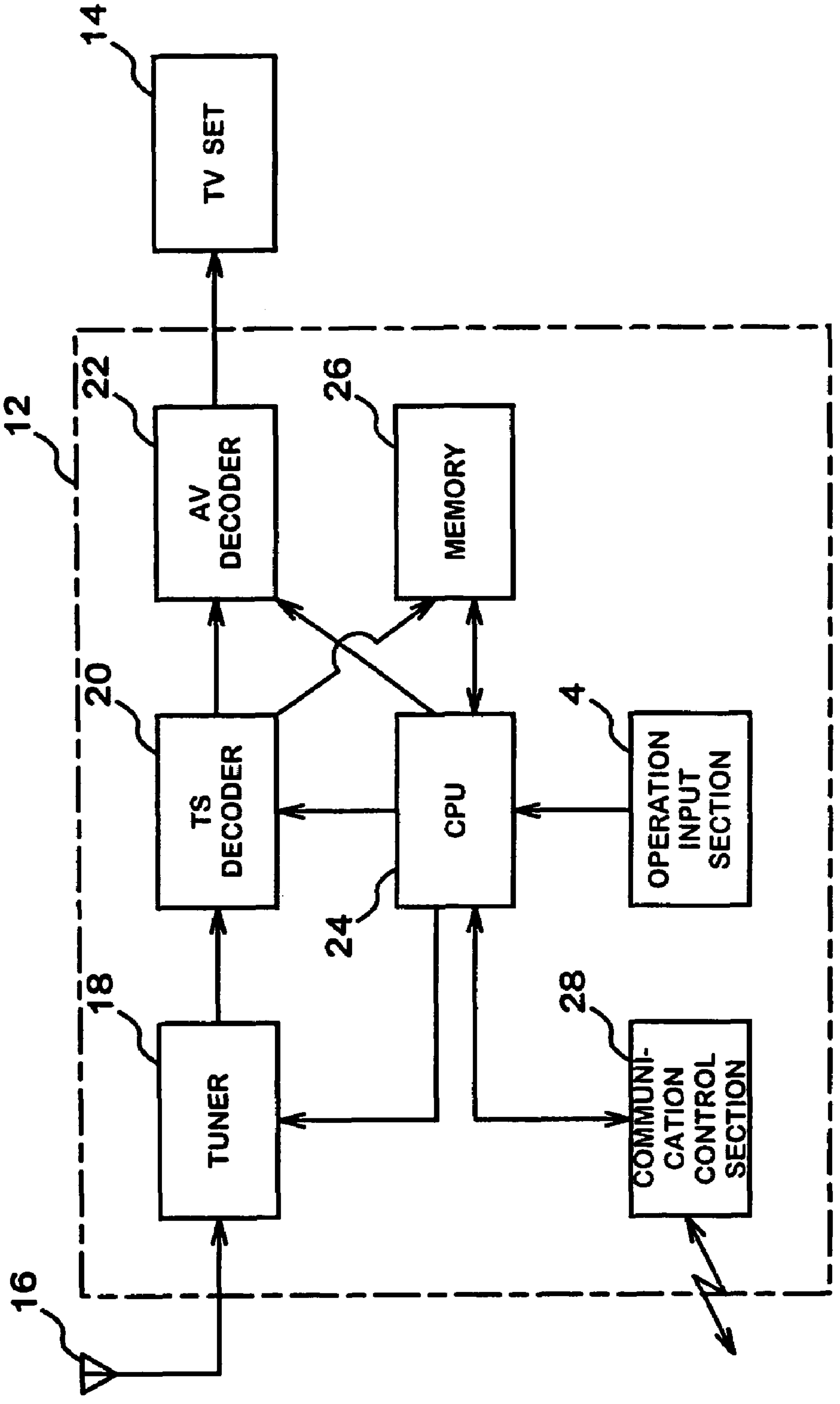
FIG. 41 shows a hardware configuration of a digital receiver.

FIG. 41 shows a hardware configuration in which the receiver shown in FIG. 40 is embodied by the use of a CPU. In the memory 26 are recorded a tune-in application, a browser application, etc.

The CPU 24 controls to acquire an intended service according to the tune-in application and the operation input (event) entered through the operation input section 4. Switching from one transport stream to another is carried out by controlling a tuner 18 according to the information of the control data NIT. Choosing an intended service from within the transport stream is carried out by controlling a transport decoder 20. The transport decoder 20 outputs the intended packet only when a packet ID is set. Therefore, CPU 24 can acquire the intended service by setting the packet ID to the transport decoder.

For example, it is assumed that an instruction is given so as to tune to the service SV2 of the HTML data. If the channel number of the service SV2 is "145," the numeral keys "1," "4," and "5" are to be pressed. In response to this, the CPU 24 sets the packet ID (fixed to 0x0000) of the control data PAT (See FIG. 38) to the TS decoder 20. As a result, contents of the control data PAT are outputted from the TS decoder 20 and stored in the memory 26. The CPU 24 refers to the control data PAT separated in this way and acquires the packet ID of the control data PMT2 of the service SV2.

Next, the packet ID of the control data PMT2 acquired as described above is set to the TS decoder 20 and the contents of the control data PMT2 is stored in the memory 26. Referring to the contents of the control data PMT2, the CPU 24 acquires the packet ID of the HTML data. Next, by setting the packet ID of the HTML data to the TS decoder 20, the HTML data are stored in the memory 26.

The HTML data stored in this way in the memory 26 are interpreted with the browser application and displayed through an AV decoder 22 on the TV set 14. The following description is based on the assumption that HTML data as shown in FIG. 40 are received.

The browser application, upon receiving the description key list:"number.basic" of the fourth line of FIG. 40, produces a receivable event table in the memory 26. That is to say, events that can be received by the browser application are stored as a table. Here, since 'number' and 'basic' are specified, events such as the numeral buttons, cursor movement buttons, decision button, etc. are deemed as receivable and a circle ( ) is recorded. The # button and the return button are not specified, determined as not receivable, and " " is recorded. Incidentally, it is predetermined what kind of buttons belong to 'number' and what kind of buttons belong to 'basic.'

Figure 43:
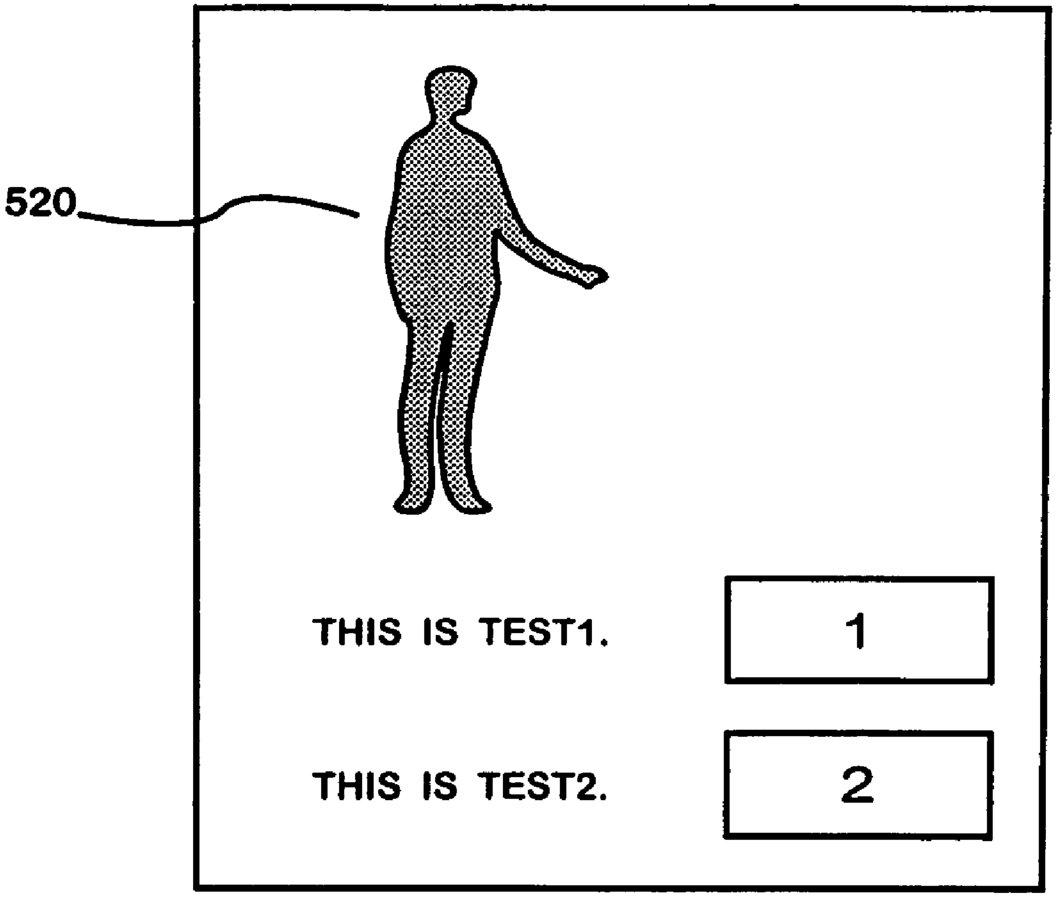
FIG. 43 is an image of the HTML data of FIG. 3 displayed using a browser.

The browser application also interprets description in other HTML and displays the contents on the TV set 14. The displayed contents are shown in FIG. 43. The image 520 shown in FIG. 43 is based on the description in the third line of the major information describing portion 512 of FIG. 40, src="http://aaa/bbb/ccc/why.png." That is to say, the display is the result of the browser application interpreting the description, acquiring the image stored in the position of http://aaa/bbb/ccc/why.png, and displaying it.

In the 11th and 12th lines of the major information describing portion 512, it is described that, when the numeral button "1" (accesskey="1") is pressed (onclick), a function img1Goto( ) is executed. In the screen display status of FIG. 43, when the event of pressing the numeral button "1" is given, the browser application refers to the receivable event table of FIG. 43 and determines if the event is receivable. Here, since the numeral button "1" is receivable to the browser application, the browser application carries out a process corresponding to the event of pressing the numeral button "1." That is to say, based on the 11th and 12th lines of the major information describing portion 512 of FIG. 40, the function img1Goto( ) is executed. The function img1Goto( ) is, as defined in the defining information describing portion 510, an instruction to move to the position of "http://aaa//bbb/ccc/s2.htm."

The browser application accordingly acquires, through the communication control section 28, information coming from the "http://aaa//bbb/ccc/s2.htm" and displays it on the TV set 14.

Incidentally, in the status of screen display shown in FIG. 43, even if the event of pressing the # button is produced, since it is defined as not receivable in the table of FIG. 42, the browser application does not accept the event. In that case, the event is given to other applications or not given to any application.

As described above, the event reception on the receiver side can be determined from the transmitting side.

7.4 OTHER EMBODIMENTS

Figure 44:
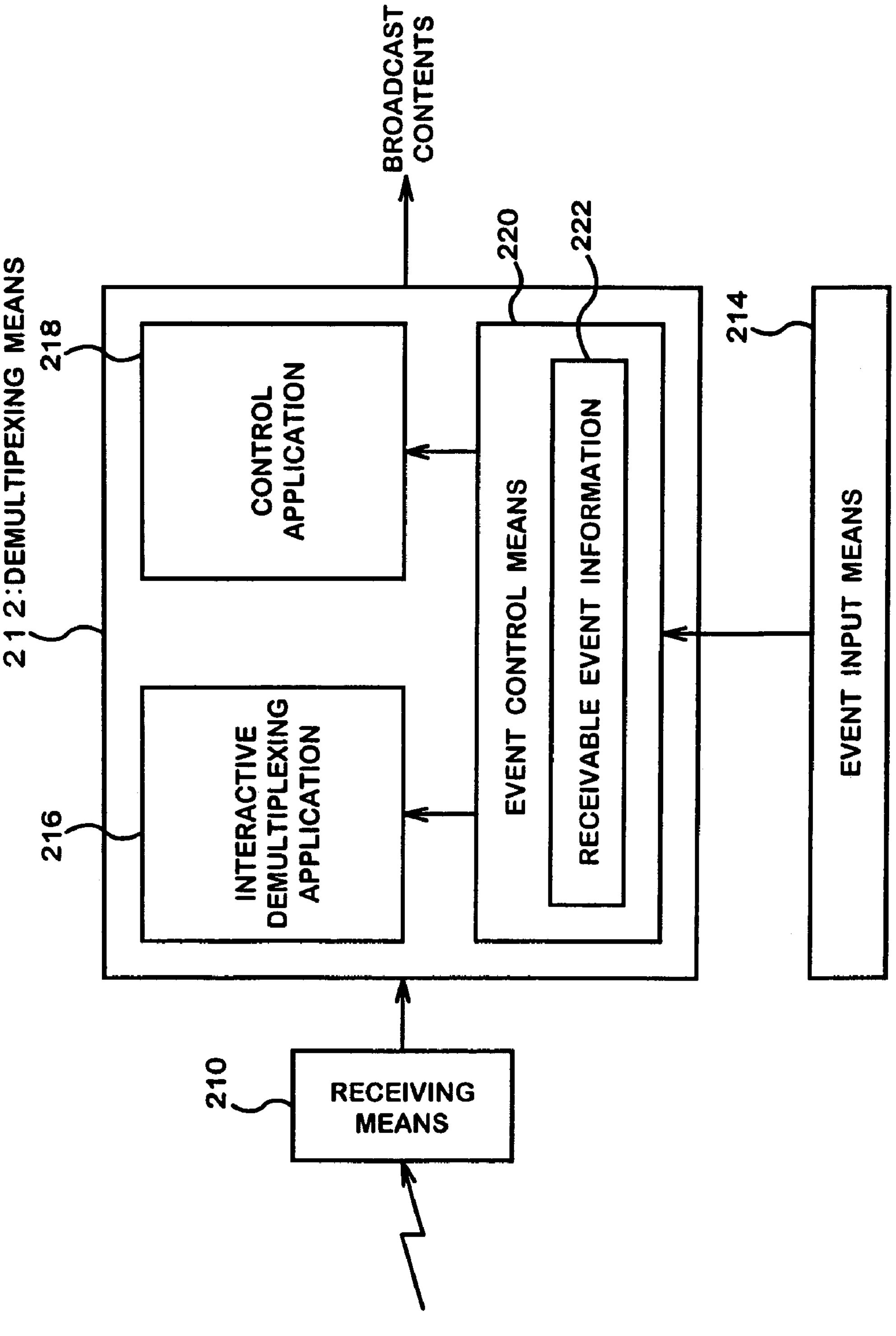
FIG. 44 shows the entire configuration of a receiver of another embodiment.

The above embodiment is arranged that the browser application creates the receivable event table and determines if the events are receivable. That is, the browser application serves also as the event control means. However, it may also be arranged that an event control program other than the browser application determines if the events are receivable. That is, as shown in FIG. 44, an event control program 220 may be provided in addition to an interactive demultiplexing application 216.

While the above embodiment is arranged that the events are arranged in groups and the receivable event information is described for every group, it is also possible to use receivable information describing the receivability for every event.

Further, while the invention is applied to the broadcast using the HTML data, the invention may also be applied to a broadcast using other self-describing type of language.

Further, while the above embodiment is arranged that the receivable event information is described in the contents data, it may also be arranged that the receivable event information is described in the control data (PMT, etc.) made to correspond to the contents data. In this way, the receivable events may be set not only for the data broadcasting using HTML or the like but also for the ordinary visual and audio broadcast.

Further, while the above embodiment is arranged that the control is made with the receivable event table, it may also be arranged that the delivery priority degree information and receivable event specifying information as shown in FIGS. 15, 16, and 17 are prepared in advance in the receiver, and the items in the browser software of the receivable event specifying information are rewritten according to the receivable event information received.

Still further, it may also be arranged that the delivery destination specifying information as shown in the first to the sixth embodiments is multiplexed and sent from the transmitting side, and the event control is made similarly to that of the first to the sixth embodiments on the receiving device side according to the delivery destination determining information.

8. EIGHTH EMBODIMENT

8.1 Entire Constitution of Digital Broadcasting System

Figure 45:
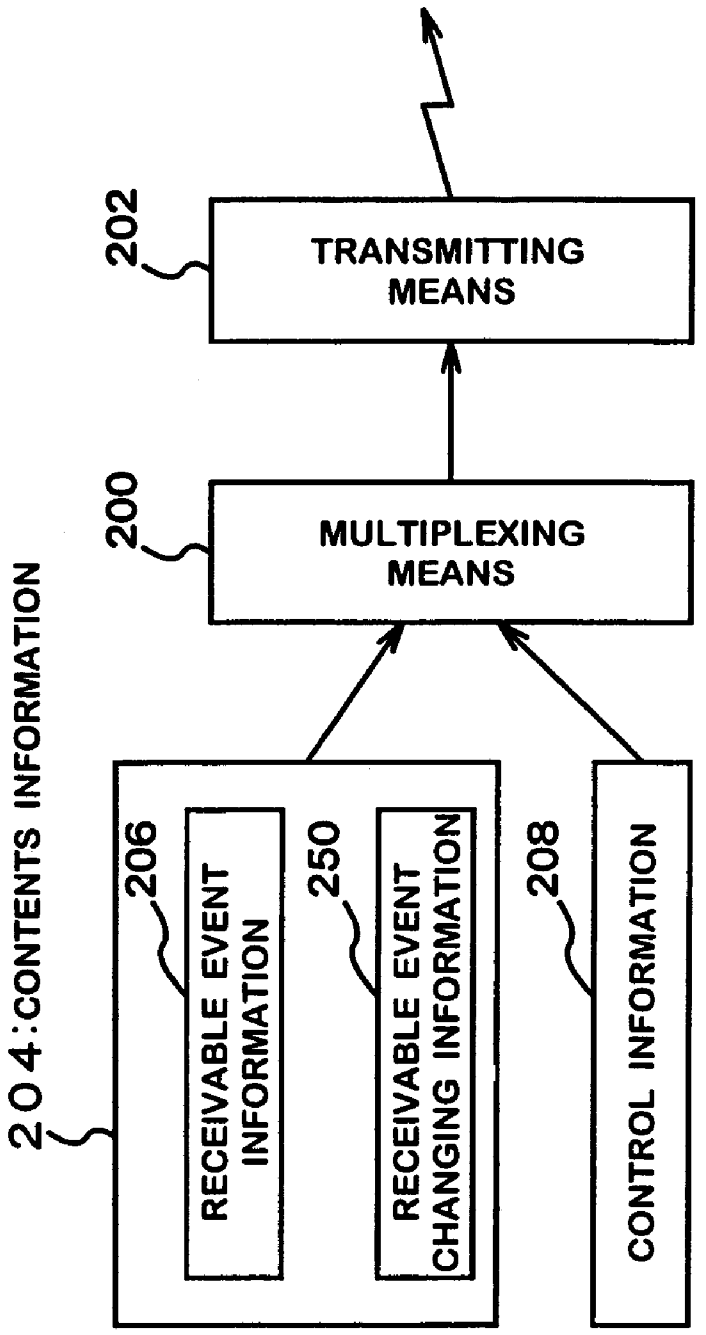
FIG. 45 shows the entire configuration of a transmitter of an eighth embodiment.
Figure 46:
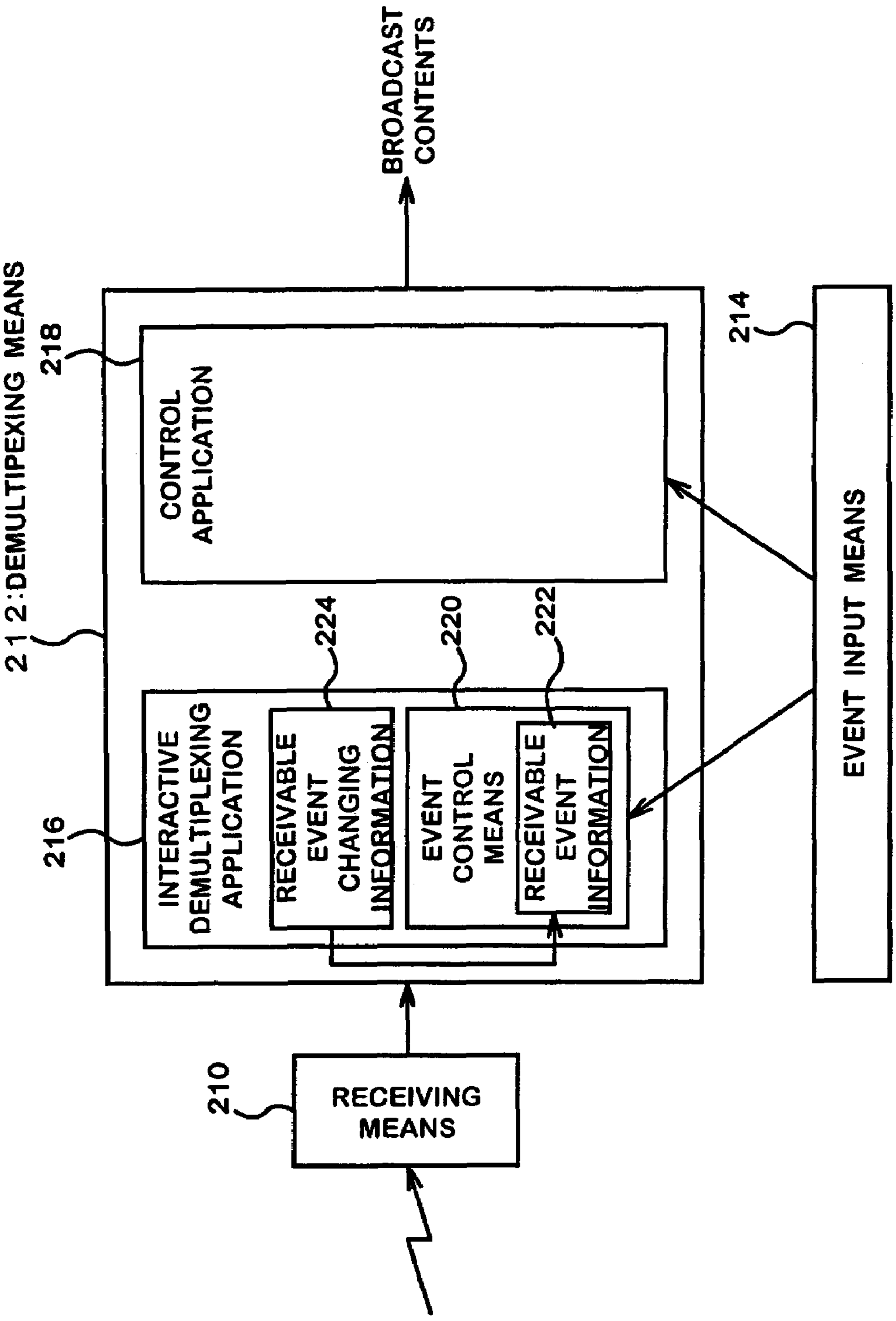
FIG. 46 shows the entire configuration of a receiver of the eighth embodiment.

FIGS. 45 and 46 show the general configuration of a digital broadcasting system. With the transmitting device shown in FIG. 45, not only the receivable event information 206 but also the receivable event changing information 250 is multiplexed and transmitted. The receivable event changing information 250 is the information for changing, according to situation, events that become receivable according to the receivable event information 206.

With the receiving device shown in FIG. 46, it is arranged that the receivable events may be changed according to the receivable event changing information received. Therefore, the receivable events may be set flexibly from the transmitting side according to the process status, etc. of the interactive demultiplexing application 216.

8.2 Transmitter

The detailed configuration of the transmitter is similar to that shown in FIG. 35. An example of HTML data transmitted is shown in FIG. 47. In this embodiment, only 'basic' is specified as the receivable event (See the third line). Therefore, while the browser application can receive the cursor movement keys and the decision key, it cannot receive the numeral keys.

In the 19th to 20th lines of the definition information describing portion 510 is defined a function, funcage1( ). The content is an instruction to rewrite 'keylist' into "number,basic." Therefore, when the function 'funcage1( )' is executed, not only the cursor movement keys and the decision key but also the numeral keys become receivable. Likewise, a function funcage2( ) is defined. Its content is an instruction to rewrite 'keylist' into "basic." Therefore, when the function 'funcage2( )' is executed, only the cursor movement keys and the decision key become receivable, and the numeral keys are not receivable.

These functions funcage1( ) and funcage2( ) are executed in the eighth line of the major information describing portion 512. In this embodiment, the receivable event changing information is constituted with the defining description of the above functions and the executing description of the above functions.

8.3 Receiver

The hardware configuration of the receiving device of FIG. 46 embodied by the use of a CPU is similar to that shown in FIG. 41. In the memory 26 are recorded the tune-in application, browser application, etc.

The process from choosing HTML data of FIG. 47 to recording it in the memory 26 is similar to that of the seventh embodiment. The browser application interprets the HTML data stored in the memory 26 and displays them on the TV set 14.

The browser application acquires the description, keylist: "basic" of the third line of FIG. 41, creates a receivable event table as shown in FIG. 48, and stored it in the memory 26. From the receivable event table, it is known that the browser application can receive only the cursor movement keys and the decision key.

Figure 49:
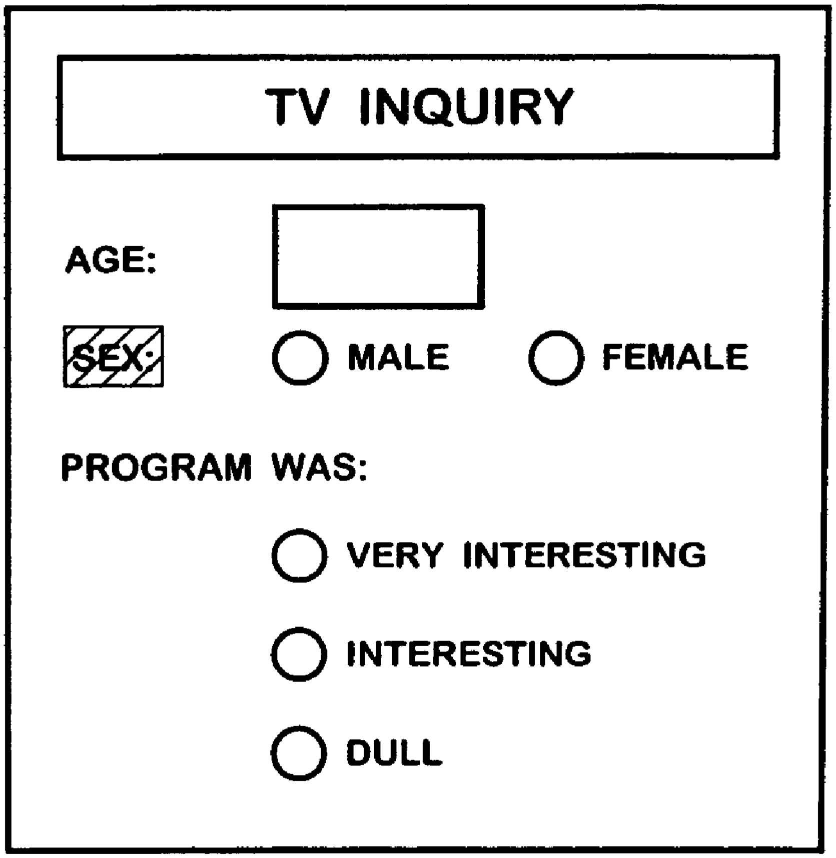
FIG. 49 is an image of the HTML data of FIG. 47 displayed by the use of a browser.

The browser application performs other HTML descriptions and displays an inquiry image as shown in FIG. 49 on the TV set 14. A viewer refers to the screen image and moves the marking cursor (focus) using the cursor movement keys to enter answers to the inquiry. The control of the cursor movement is performed with the browser application. FIG. 49 shows a status in which the marking cursor is located (focused) at the item of sex. Namely, the item sex may be entered in this status.

Figure 50:
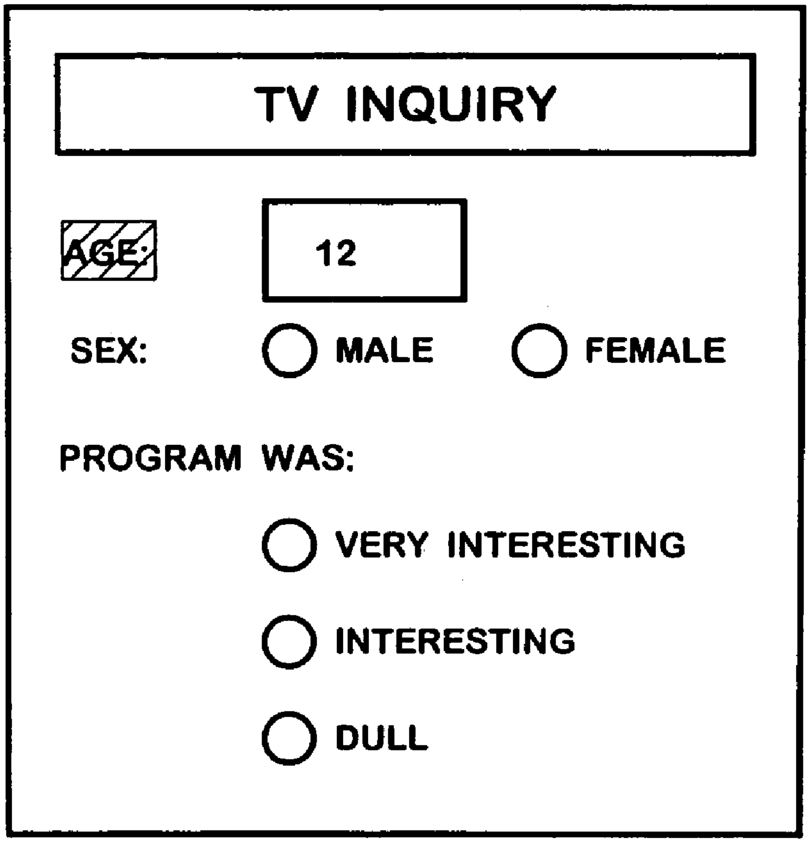
FIG. 50 is an image of the HTML data of FIG. 47 displayed by the use of a browser.

When the cursor move-up key is operated in the status of FIG. 49, the item 'age' is brought into focus. The browser application detects this status and executes the function funcage1( ). Namely, the browser application interprets the description onfocus="funcage1" in the eighth line of the major information describing portion 512 of FIG. 47 and executes it. The description onfocus="funcage1" means that the function funcage1( ) is executed in the status of "age" in focus. The function funcage1( ) is, as described in the definition information describing portion 510, a function for rewriting 'keylist' into "number.basic." Therefore, when "age" is brought into focus, the description becomes keylist="number.basic.". In response to this, the receivable event table is also rewritten from the status shown in FIG. 48 to that shown in FIG. 42. That is to say, the numeral keys also become receivable. Therefore, the viewer can give the event of pressing numeral keys to the browser application to enter the age by numerals as shown in FIG. 50.

Further, when "age" is put out of focus by the operation on the cursor movement key, the browser application detects the operation and executes the function funcage2( ). That is to say, the browser application interprets the description onblur="funcage2" and executes it. The description onblur="funcage2" means that the function funcage2( ) is executed in the status of the "age" being out of focus. The function funcage2( ) is, as described in the definition information describing portion 510, a function for rewriting 'keylist' into "basic." Therefore, when the "age" is put out of focus, the description becomes keylist="basic," As a result, the receivable event table shown in FIG. 42 is also rewritten as shown in FIG. 48. Namely, the status of the numeral keys is brought back to the status not receivable.

When a transmission button or the like (not shown) is operated, the answers entered are transmitted through a communication control section 28 to a service provider, etc.

As described above, the use of receivable event changing information makes it possible to change the receivable events appropriately according to the situation. It is also possible to specify such changes from the transmitting side.

The possible modifications of the seventh embodiment described before may also be applied to this embodiment.

9. Others

While various functions of the above embodiment are effected with the CPU, they may be effected partly or entirely with a hardware logic.

While the above description is made only in connection with the receiving operation, the invention may also be applied to devices for recording and reproducing transport streams. In that case, it may be arranged that the delivery destination determining information and the receivable event information may be changed depending on whether they are used for reception or transmission.

While the invention is described above by way of preferable embodiments, the language used is not for limitation but for explanation and may be changed without departing from scope and spirit of the invention within the scope of the appended claims.

What is claimed is:

1. A digital broadcast receiver that sends an event corresponding to an input from a user to an application, comprising:

a receiver that receives video data, audio data, and the application which are transmitted by a digital broadcast;

a decoder that decodes the video data, the audio data and the application received by the receiver;

a processor that executes the application received by the receiver;

an input section that receives the user input;

an event controlling program that sends the event corresponding to the user input to the executing application; and a communication controller that receives update data via the Internet to update the event controlling program;

wherein the executing application registers receivable event information that identifies an event that can be received by the executing application in the digital broadcast receiver, the event controlling program sends the event corresponding to the user input to the executing application when the receivable event information identifies that the event corresponding to the user input can be received by the executing application, and the event controlling program is updated with the received update data received by the communication controller.

2. The digital broadcast receiver of claim 1, further comprising:

a demultiplexer that demultiplexes the video data, the audio data, and the application which have been multiplexed in the transmitted digital broadcast, wherein the receiver receives the video data, the audio data, and the application multiplexed in the transmitted digital broadcast, the decoder decodes the video data, the audio data and the application demultiplexed by the demultiplexer, and the processor executes the demultiplexed application.

3. The digital broadcast receiver of claim 1, wherein the executing application alters the receivable event information based on a running status of the application.

4. The digital broadcast receiver of claim 1, wherein the input section comprises a key, the event corresponding to the user input being an event corresponding to a depression of the key by the user.

5. The digital broadcast receiver of claim 1, wherein the input section comprises a mouse, the event corresponding to the user input being an event corresponding to a click on the mouse by the user.

6. The digital broadcast receiver of claim 1, wherein the input section comprises a mouse, the event corresponding to the user input being an event corresponding to a movement of the mouse by the user.

7. A program stored on a storage medium that executes instructions for controlling a digital broadcast receiver, comprising:

decoding video data, audio data and an application received by a transmitted digital broadcast;

executing the received application;

receiving an input from a user;

instructing an event controlling program to send an event corresponding to the user input to the executing application; and updating the event controlling program in accordance with update data received via the Internet;

wherein the executing application registers receivable event information that identifies an event that can be received by the executing application in the digital broadcast receiver, the event controlling program sends the event corresponding to the user input to the executing application when the receivable event information identifies that the event corresponding to the user input can be received by the executing application.

8. A digital broadcast receiver that sends an event corresponding to an input from a user to an application, comprising:

a receiver that receives the application which is transmitted by a digital broadcast;

a decoder that decodes the application received by the receiver;

a processor that executes the application received by the receiver;

an input section that receives the user input;

an event controlling program that sends an event corresponding to the user input to the executing application; and a communication controller that receives update data via the Internet to update the event controlling program;

wherein the event controlling program sends the event corresponding to the user input to the executing application when receivable event information identifies that the event corresponding to the user input can be received by the executing application, and the event controlling program is updated with the received update data received by the communication controller.

9. The digital broadcast receiver of claim 8, wherein the application is multiplexed with at least one of video data and audio data to form the transmitted digital broadcast, a demultiplexer demultiplexing the application and the at least the one of video data and audio data which have been multiplexed in the transmitted digital broadcast, wherein the receiver receives the application and the at least one of video data and audio data, multiplexed in the transmitted digital broadcast, the decoder decodes the application and the at least one of video data and audio data demultiplexed by the demultiplexer, and the processor executes the demultiplexed application.

10. The digital broadcast receiver of claim 8, wherein the executing application alters the receivable event information based on a running status of the application.

11. The digital broadcast receiver of claim 8, wherein the input section comprises a key, the event corresponding to the user input being an event corresponding to a depression of the key by the user.

12. The digital broadcast receiver of claim 8, wherein the input section comprises a mouse, the event corresponding to the user input being an event corresponding to a click on the mouse by the user.

13. The digital broadcast receiver of claim 8, wherein the input section comprises a mouse, the event corresponding to the user input being an event corresponding to a movement of the mouse by the user.

* * * * *